United States Patent
Ito et al.

(10) Patent No.: US 12,503,614 B2
(45) Date of Patent: Dec. 23, 2025

(54) RESIN EMULSION FOR WATER-BASED INK

(71) Applicant: NIPPON SHOKUBAI CO., LTD., Osaka (JP)

(72) Inventors: Takumi Ito, Suita (JP); Yoshimine Sakamoto, Suita (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 693 days.

(21) Appl. No.: 17/759,486

(22) PCT Filed: Jan. 16, 2021

(86) PCT No.: PCT/JP2021/001383
§ 371 (c)(1),
(2) Date: Jul. 26, 2022

(87) PCT Pub. No.: WO2021/153288
PCT Pub. Date: Aug. 5, 2021

(65) Prior Publication Data
US 2023/0094605 A1  Mar. 30, 2023

(30) Foreign Application Priority Data

Jan. 27, 2020  (JP) .................................. 2020-010636

(51) Int. Cl.
*C09D 11/023* (2014.01)
*C09D 11/102* (2014.01)
*C09D 11/106* (2014.01)

(52) U.S. Cl.
CPC .......... *C09D 11/023* (2013.01); *C09D 11/102* (2013.01); *C09D 11/106* (2013.01)

(58) Field of Classification Search
CPC ... C09D 11/023; C09D 11/102; C09D 11/106; C09D 11/30; C08F 20/06; C08F 26/10; C08K 5/16; C08L 33/04; C08L 101/00; C08L 101/08
See application file for complete search history.

(56) References Cited

U.S. PATENT DOCUMENTS

| | | | | |
|---|---|---|---|---|
| 4,460,727 A | * | 7/1984 | Shoji | C09D 11/16 106/31.86 |
| 6,439,708 B1 | * | 8/2002 | Kato | B41J 2/15 347/100 |
| 2001/0009933 A1 | * | 7/2001 | Miyabayashi | C09D 11/54 523/160 |

FOREIGN PATENT DOCUMENTS

| | | |
|---|---|---|
| CN | 103468096 A | 12/2013 |
| JP | 2001-49151 A | 2/2001 |
| JP | 2004-107478 A | 4/2004 |
| JP | 2015-34295 A | 2/2015 |
| JP | 2015-57455 A | 3/2015 |
| JP | 2016-33206 A | 3/2016 |
| JP | 6258662 B2 | 1/2018 |
| JP | 2018-59007 A | 4/2018 |

OTHER PUBLICATIONS

International Search Report mailed on Apr. 6, 2021 in PCT/JP2021/001383 filed on Jan. 16, 2021 (2 pages).
Combined Chinese Office Action and Search Report issued Feb. 24, 2023, in corresponding Chinese Patent Application No. 202180008452.2 (with English Translation of Category of Cited Documents), 17 pages.

* cited by examiner

*Primary Examiner* — Doris L Lee
(74) *Attorney, Agent, or Firm* — Oblon, McClelland, Maier & Neustadt, L.L.P.

(57) ABSTRACT

A resin emulsion to be used in a water-based ink, wherein the resin emulsion for a water-based ink is characterized by containing emulsion particles and a carboxylic acid polymer non-metal salt and by the emulsion particles containing a polymer comprising a monomer component including a nitrogen atom-containing monomer; and a resin emulsion for a water-based ink that can be used suitably in the water-based ink and a method for producing the same.

6 Claims, No Drawings

RESIN EMULSION FOR WATER-BASED INK

TECHNICAL FIELD

The present invention relates to a resin emulsion for a water-based ink. More specifically, the present invention relates to a resin emulsion for a water-based ink and a method for producing the same, and a water-based ink containing the resin emulsion for a water-based ink. The water-based ink according to the present invention can be suitably used as, for example, inks such as a water-based ink for inkjet printing, a flexo graphic ink, an ink for offset printing, an ink for lithographic printing, an ink for gravure printing, and an ink for screen printing. The water-based ink according to the present invention can be particularly suitably used as the water-based ink for inkjet printing.

BACKGROUND ART

An ink is roughly classified into two types of inks of an organic solvent-based ink in which an organic solvent is used as a main component of a solvent and a water-based ink in which water is used as a main component of a solvent.

An organic solvent-based ink composition has good water resistance, because the main component of its solvent is an organic solvent. However, the organic solvent-based ink composition is not good in safety for human bodies, and generates an odor based on the organic solvent. Therefore, the water-based ink has recently been focused.

As a water-based ink composition which is excellent in storage stability, and which forms a coating film being excellent in curl resistance, scratch resistance, water resistance and weather resistance as a whole, a water-based ink composition containing a resin emulsion including emulsion particles as an essential component, which further contains at least one water-insoluble curable compound selected from the group consisting of a water-insoluble curable monomer and a water-insoluble curable oligomer, and in which a glass transition temperature of a polymer which constitutes the emulsion particles is 0 to 120° C., and a minimum film-forming temperature of the water-based ink composition is 0 to 30° C. has been proposed (see, for example, Patent Literature 1).

The water-based ink composition forms a coating film being comprehensively excellent in curl resistance, scratch resistance, water resistance and weather resistance. Therefore, the water-based ink composition can be suitably used for an industrial ink for forming information such as desired characters, patterns, colors and the like on a substrate made of a material such as paper, a resin sheet, a resin film, a metal plate, a wood plate or a leather sheet by means of inkjet printing, flexographic press, offset printing, lithographic printing, gravure printing, screen printing or an ink ribbon, and for imparting designability, scratch resistance, water resistance, weather resistance and the like to the substrate.

Recently, it has been desired to develop a water-based ink being excellent in not only scratch resistance but also adhesion property to a substrate and blocking resistance in the field of an ink.

PRIOR ART LITERATURES

Patent Literatures

Patent Literature 1; Japanese Patent No. 6258662

SUMMARY OF THE INVENTION

Problems to be Solved by the Invention

The present invention has been made in view of the above-mentioned prior art. An object of the present invention is to provide a water-based ink being excellent in scratch resistance, adhesion property to a substrate and blocking resistance, and a resin emulsion for a water-based ink, which can be suitably used for the water-based ink, and a method for producing the resin emulsion.

Means for Solving the Problem

The present invention relates to:
(1) a resin emulsion used for a water-based ink, including emulsion particles and a carboxylic acid polymer non-metal salt, wherein the emulsion particles include a polymer made of a monomer component including a nitrogen atom-containing monomer;
(2) a method for producing a resin emulsion which is used in a water-based ink, which includes carrying out an emulsion-polymerization of a monomer component including a nitrogen atom-containing monomer, to give a resin emulsion including emulsion particles, and mixing the resin emulsion with a carboxylic acid polymer non-metal salt;
(3) the resin emulsion for a water-based ink according to the above item (1), wherein the nitrogen atom-containing monomer is a piperidine monomer or a nitrogen atom-containing (meth)acrylate;
(4) the resin emulsion for a water-based ink according to the above item (3), wherein the piperidine monomer is (meth)acryloyloxy group-containing piperidine or (meth)acryloylamino group-containing piperidine;
(5) a method for producing a resin emulsion which is used in a water-based ink, which includes carrying out an emulsion-polymerization of a monomer component including a nitrogen atom-containing monomer, to give a resin emulsion including emulsion particles, and mixing the resin emulsion with a carboxylic acid polymer non-metal salt; and
(6) a water-based ink including the resin emulsion for a water-based ink according to the above item (1) and a colorant.

Effect of the Invention

According to the present invention, there are provided a water-based ink being excellent in scratch resistance, adhesion property to a substrate and blocking resistance, and a resin emulsion for the water-based ink which can be suitably used for the water-based ink and a method for producing the resin emulsion.

MODE FOR CARRYING OUT THE INVENTION

The resin emulsion for a water-based ink according to the present invention includes emulsion particles and a carboxylic acid polymer non-metal salt, and the emulsion particles includes a polymer made of a monomer component including a nitrogen atom-containing monomer.

The water-based ink according to the present invention includes the resin emulsion for a water-based ink. Therefore, the water-based ink according to the present invention is excellent in scratch resistance, adhesion property to a substrate and blocking resistance.

The resin emulsion for a water-based ink according to the present invention can be easily prepared by carrying out an emulsion-polymerization of a monomer component including a nitrogen atom-containing monomer, to give a resin emulsion containing emulsion particles, and mixing the resin emulsion with a carboxylic acid polymer non-metal salt.

According to the resin emulsion for a water-based ink of the present invention, a monomer component including a nitrogen atom-containing monomer is used as a raw material for a polymer contained in the emulsion particles. Therefore, a water-based ink being excellent in scratch resistance, adhesion property to a substrate and blocking resistance can be obtained by using the resin emulsion for a water-based ink.

The nitrogen atom-containing monomer includes, for example, a piperidine monomer, a nitrogen atom-containing (meth)acrylate, a (meth)acrylamide compound, an N-vinyl group-containing monomer, an oxazoline monomer, a (meth)acrylonitrile compound, and the like. The present invention is not limited only to those exemplified ones. These nitrogen atom-containing monomers can be used alone or in combination of two or more kinds thereof, respectively. Among the nitrogen atom-containing monomers, the piperidine monomer and the nitrogen atom-containing (meth)acrylate are preferable from the viewpoint of improvement in scratch resistance, adhesion property to a substrate and blocking resistance of the water-based ink.

Incidentally, in the present invention, the term "(meth) acryl" means "acryl" or "methacryl", the term "(meth) acrylate" means "acrylate" or "methacrylate", and the term "(meth)acryloyl" means "acryloyl" or "methacryloyl".

The piperidine monomer includes, for example, (meth) acryloyloxy group-containing piperidines such as 4-(meth) acryloyloxy-2,2,6,6-tetramethylpiperidine, 4-(meth)acryloyloxy-1,2,2,6,6-pentamethylpiperidine and 4-cyano-4-(meth)acryloyloxy-2,2,6,6-tetramethylpiperidine; (meth) acryloylamino group-containing piperidines such as 4-(meth)acryloylamino-2,2,6,6-tetramethylpiperidine, 1-(meth)acryloyl (meth)acryloylamino-2,2,6,6-tetramethylpiperidine, 4-(meth)acryloylamino-1,2,2,6,6-pentamethylpiperidine, 4-cyano-4-(meth)acryloylamino-2,2,6,6-tetramethylpiperidine and 1-(meth)acryloyl-4-cyano-4-(meth) acryloylamino-2,2,6,6-tetramethylpiperidine; crotonoyl group-containing piperidines such as 4-crotonoylamino-2,2,6,6-tetramethylpiperidine, 4-crotonoyloxy-2,2,6,6-tetramethylpiperidine and 1-crotonoyl-4-crotonoyloxy-2,2,6,6-tetramethylpiperidine; (meth)acryloylalkoxy group-containing piperidines such as 4-(meth)acryloyl-1-methoxy-2,2,6,6-tetramethylpiperidine; and the like. The present invention is not limited only to those exemplified ones. These piperidine monomers can be used alone or in combination of two or more kinds thereof, respectively. Among the piperidine monomers, (meth)acryloyloxy group-containing piperidine and (meth)acryloylamino group-containing piperidine are preferable, (meth)acryloyloxy group-containing piperidine is more preferable, 4-(meth)acryloyloxy-2,2,6,6-tetramethylpiperidine and 4-(meth)acryloyloxy-1,2,2,6,6-pentamethylpiperidine are furthermore preferable, and 4-(meth)acryloyloxy-1,2,2,6,6-pentamethylpiperidine is even more preferable, from the viewpoint of improvement in scratch resistance, adhesion property to a substrate and blocking resistance of the water-based ink.

The nitrogen atom-containing (meth)acrylate includes, for example, a nitrogen atom-containing (meth)acrylate represented by the formula (I);

[Chem.1]

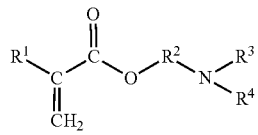

wherein $R^1$ is hydrogen atom or methyl group, $R^2$ is an alkylene group having 1 to 4 carbon atoms, and each of $R^3$ and $R^4$ is independently an alkyl group having 1 to 4 carbon atoms; ethylene oxide-added (meth)acrylate of morpholine; and the like. These nitrogen atom-containing (meth)acrylates can be used alone or in combination of two or more kinds thereof, respectively. The nitrogen atom-containing (meth)acrylate includes a primary amine, a secondary amine and a tertiary amine. It is preferred that the nitrogen atom-containing (meth)acrylate is the tertiary amine from the viewpoint of improvement in scratch resistance, adhesion property to a substrate and blocking resistance of the water-based ink.

The nitrogen atom-containing (meth)acrylate represented by the formula (I) can be suitably used in the present invention from the viewpoint of improvement in scratch resistance, adhesion property to a substrate and blocking resistance of the water-based ink.

In formula (I), $R^1$ is hydrogen atom or methyl group. $R^2$ is an alkylene group having 1 to 4 carbon atoms. Among the alkylene groups having 1 to 4 carbon atoms, methylene group and ethylene group are preferable from the viewpoint of improvement in scratch resistance, adhesion property to a substrate and blocking resistance of the water-based ink. Each of $R^3$ and $R^4$ is independently an alkyl group having 1 to 4 carbon atoms. Among the alkyl groups having 1 to 4 carbon atoms, methyl group and ethyl group are preferable from the viewpoint of improvement in scratch resistance, adhesion property to a substrate and blocking resistance of the water-based ink.

Specific examples of the nitrogen atom-containing (meth) acrylate represented by the formula (I) include, for example, dimethylaminoethyl (meth)acrylate, dimethylaminomethyl (meth)acrylate, dimethylaminoethyl (meth)acrylate, and diethylaminomethyl (meth)acrylate, diethylaminoethyl (meth)acrylate, and the like. The present invention is not limited only to those exemplified ones. Among the nitrogen atom-containing (meth)acrylates, dimethylaminoethyl (meth)acrylate is preferable from the viewpoint of improvement in scratch resistance, adhesion property to a substrate and blocking resistance of the water-based ink.

The (meth)acrylamide compound includes, for example, (meth)acrylamide, N-monomethyl(meth)acrylamide, N-monoethyl(meth)acrylamide, N,N-dimethyl(meth)acrylamide, N-n-propyl(meth)acrylamide, N-isopropyl(meth) acrylamide, methylenebis(meth)acrylamide, N-methylol (meth)acrylamide, N-butoxymethyl(meth)acrylamide, dimethylaminoethyl(meth)acrylamide, N,N-dimethylaminopropylacrylamide, and the like. The present invention is not limited only to those exemplified ones. These (meth) acrylamide compounds can be used alone or in combination of two or more kinds thereof, respectively.

The N-vinyl group-containing monomer includes, for example, N-vinylpyrrolidone, N-vinylpyridine, N-vinylimidazole, N-vinylpyrrole, N-vinyloxazolidone, N-vinylsuccinimide, N-vinylmethylcarbamate, N,N-methylvinylacetamide, and the like. The present invention is not limited only to those exemplified ones. These N-vinyl group-containing monomers can be used alone or in combination of two or more kinds thereof, respectively.

The oxazoline monomer includes, for example, 2-isopropenyl oxazoline, 2-vinyl-2-oxazoline, and the like. The present invention is not limited only to those exemplified ones. These oxazoline monomers can be used alone or in combination of two or more kinds thereof, respectively.

The (meth)acrylonitrile compound includes, for example, acrylonitrile and methacrylonitrile. The acrylonitrile and the methacrylonitrile can be used alone or in combination thereof, respectively.

The content of the nitrogen atom-containing monomer in the monomer component is preferably 0.5 to 10% by mass, more preferably 1 to 5% by mass, furthermore preferably 2 to 5% by mass, and even more preferably 3 to 5% by mass, from the viewpoint of improvement in scratch resistance, adhesion property to a substrate and blocking resistance of the water-based ink.

Incidentally, it is preferred that the emulsion particles include plural resin layers, and that the nitrogen atom-containing monomer is included in the monomer component for forming an outermost resin layer, from the viewpoint of improvement in scratch resistance, adhesion property to a substrate and blocking resistance of the water-based ink. The content of the nitrogen atom-containing monomer in the monomer component for forming the outermost resin layer is preferably 1 to 20% by mass, more preferably 2 to 10% by mass, furthermore preferably 3 to 10% by mass, and even more preferably 5 to 10% by mass, from the viewpoint of improvement in scratch resistance, adhesion property to a substrate and blocking resistance of the water-based ink.

The monomer component includes a monomer other than the nitrogen atom-containing monomer. The monomer other than the nitrogen atom-containing monomer used in the monomer component includes, for example, a monofunctional monomer other than the nitrogen atom-containing monomer and a polyfunctional monomer other than the nitrogen atom-containing monomer. The monofunctional monomer other than the nitrogen atom-containing monomer and the polyfunctional monomer other than the nitrogen atom-containing monomer can used alone or in combination thereof, respectively. Among the monofunctional monomer other than the nitrogen atom-containing monomer and the polyfunctional monomer other than the nitrogen atom-containing monomer, it is conceivable to use only the polyfunctional monomer other than the nitrogen atom-containing monomer in the monomer component. Among the monofunctional monomer other than the nitrogen atom-containing monomer and the polyfunctional monomer other than the nitrogen atom-containing monomer, it is preferable that only the monofunctional monomer other than the nitrogen atom-containing monomer is used, or that both of the monofunctional monomer other than the nitrogen atom-containing monomer and the polyfunctional monomer other than the nitrogen atom-containing monomer are used in combination in the present invention.

Representative examples of the monofunctional monomer other than nitrogen atom-containing monomers include an ethylenically unsaturated monofunctional monomer other than the nitrogen atom-containing monomer. Incidentally, the ethylenically unsaturated monofunctional monomer is a monomer having one ethylenically unsaturated double bond. The ethylenically unsaturated monofunctional monomer other than the nitrogen atom-containing monomer includes, for example, an alkyl (meth)acrylate, a hydroxyl group-containing (meth)acrylate, an aralkyl (meth)acrylate, an alkoxyalkyl (meth)acrylate, a carboxyl group-containing monomer, an oxo group-containing monomer, a fluorine atom-containing monomer, a styrene-based monomer, an epoxy group-containing monomer, a silane group-containing monomer, a carbonyl group-containing monomer, and the like. The present invention is not limited only to those exemplified ones. These ethylenically unsaturated monofunctional monomers can be used alone or in combination of two or more kinds thereof, respectively.

The alkyl (meth)acrylate includes, for example, alkyl (meth)acrylates having an alkyl group of 1 to 18 carbon atoms, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, sec-butyl (meth)acrylate, 2-ethylhexyl (meth)acrylate, n-octyl (meth)acrylate, tridecyl (meth)acrylate, n-lauryl (meth)acrylate, dodecyl (meth)acrylate, stearyl (meth)acrylate, isobornyl (meth)acrylate, cyclohexyl (meth)acrylate, 4-methylcyclohexylmethyl (meth)acrylate, tert-butylcyclohexyl (meth)acrylate, cyclododecyl (meth)acrylate, and the like. The present invention is not limited only to those exemplified ones. These alkyl (meth)acrylates can be used alone or in combination of two or more kinds thereof, respectively. Among the alkyl (meth)acrylates, the alkyl (meth)acrylate having an alkyl group of 1 to 12 carbon atoms is preferable, the alkyl (meth)acrylate having an alkyl group of 1 to 8 carbon atoms is more preferable, and methyl (meth)acrylate, n-butyl (meth)acrylate, isobutyl (meth)acrylate, tert-butyl (meth)acrylate, sec-butyl (meth)acrylate, 2-ethylhexyl (meth)acrylate and cyclohexyl (meth)acrylate are furthermore preferable, from the viewpoint of improvement in scratch resistance, adhesion property to a substrate and blocking resistance of the water-based ink.

The content of the alkyl (meth)acrylate in the monomer component is preferably 40 to 98% by mass from the viewpoint of improvement in scratch resistance, adhesion property to a substrate and blocking resistance of the water-based ink.

The hydroxyl group-containing (meth)acrylate includes, for example, hydroxyl group-containing (meth)acrylates having an ester moiety of 1 to 18 carbon atoms such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate and caprolactone-modified hydroxy (meth)acrylate, and the like. The present invention is not limited only to those exemplified ones. These hydroxyl group-containing (meth)acrylates can be used alone or in combination of two or more kinds thereof, respectively. Among the hydroxyl group-containing (meth)acrylate, the hydroxyalkyl (meth)acrylate having an alkyl group of 1 to 12 carbon atoms is preferable, the hydroxyalkyl (meth)acrylate having an alkyl group of 1 to 8 carbon atoms is more preferable, the hydroxyalkyl (meth)acrylate having an alkyl group of 1 to 4 carbon atoms is furthermore preferable, and 2-hydroxyethyl (meth)acrylate and 4-hydroxybutyl (meth)acrylate are even more preferable, from the viewpoint of improvement in scratch resistance, adhesion property to a substrate and blocking resistance of the water-based ink.

The content of the hydroxyl group-containing (meth)acrylate in the monomer component is preferably 0.5 to 30% by mass from the viewpoint of improvement in scratch resistance, adhesion property to a substrate and blocking resistance of the water-based ink.

The aralkyl (meth)acrylate includes, for example, aralkyl (meth)acrylates having an aralkyl group of 7 to 18 carbon atoms, such as benzyl (meth)acrylate, phenylethyl (meth)

acrylate, methylbenzyl (meth)acrylate and naphthylmethyl (meth)acrylate, and the like. The present invention is not limited only to those exemplified ones. These aralkyl (meth)acrylates can be used alone or in combination of two or more kinds thereof, respectively.

The alkoxyalkyl (meth)acrylate includes, for example, methoxyethyl (meth)acrylate, methoxybutyl (meth)acrylate, ethoxybutyl (meth)acrylate, trimethylolpropanetripropoxy (meth)acrylate, and the like. The present invention is not limited only to those exemplified ones. These alkoxyalkyl (meth)acrylates can be used alone or in combination of two or more kinds thereof, respectively.

The carboxyl group-containing monomer includes, for example, (meth)acrylic acid, maleic acid, fumaric acid, crotonic acid, itaconic acid, citraconic acid, maleic anhydride, maleic acid monomethyl ester, maleic acid monobutyl ester, itaconic acid monomethyl ester, itaconic acid monobutyl ester, vinyl benzoic acid, oxalic acid monohydroxyethyl (meth)acrylate, carboxyl group-terminated caprolactone-modified (meth)acrylate, and the like. The present invention is not limited only to those exemplified ones. These carboxyl group-containing monomers can be used alone or in combination of two or more kinds thereof, respectively. Among the carboxyl group-containing monomer, acrylic acid, methacrylic acid and itaconic acid are preferable, and acrylic acid and methacrylic acid are more preferable, from the viewpoint of improvement in the dispersion stability of the emulsion particles.

The oxo group-containing monomer includes, for example, (di)ethylene glycol(methoxy) (meth)acrylates such as ethylene glycol (meth)acrylate, ethylene glycol methoxy (meth)acrylate, diethylene glycol (meth)acrylate, diethylene glycol methoxy (meth)acrylate, and the like. The present invention is not limited only to those exemplified ones. These oxo group-containing monomers can be used alone or in combination of two or more kinds thereof, respectively.

The fluorine atom-containing monomer includes, for example, fluorine atom-containing alkyl (meth)acrylates having fluorine atom in its ester moiety, such as trifluoroethyl (meth)acrylate, tetrafluoropropyl (meth)acrylate, octafluoropentyl (meth)acrylate, perfluorobutylethyl (meth)acrylate, perfluoroisononylethyl (meth)acrylate and perfluorooctylethyl (meth)acrylate, and the like. The present invention is not limited only to those exemplified ones. These fluorine atom-containing monomers can be used alone or in combination of two or more kinds thereof, respectively.

The styrene-based monomer includes, for example, styrene; alkylstyrenes having an alkyl group of 1 to 4 carbon atoms, such as α-methylstyrene, o-methylstyrene, m-methylstyrene, p-methylstyrene, o-ethylstyrene, m-ethylstyrene, p-ethylstyrene, and o-tert-butyl styrene, m-tert-butylstyrene and p-tert-butylstyrene; alkoxystyrenes having an alkoxy group of 1 to 4 carbon atoms, such as o-methoxystyrene, m-methoxystyrene, p-methoxystyrene, o-ethoxystyrene, m-ethoxystyrene, p-ethoxystyrene, o-tert-butoxystyrene, m-tert-butoxystyrene and p-tert-butoxystyrene; halogen atom-containing styrenes such as o-fluorostyrene, m-fluorostyrene, p-fluorostyrene, o-chlorostyrene, m-chlorostyrene, p-chlorostyrene, o-bromostyrene, m-bromostyrene and p-bromostyrene; acetoxystyrenes such as o-acetoxystyrene, m-acetoxystyrene and p-acetoxystyrene; vinyltoluene; and the like. The present invention is not limited only to those exemplified ones. These monomers can be used alone or in combination of two or more kinds thereof, respectively. The styrene-based monomer may have a functional group such as an alkyl group such as methyl group or tert-butyl group, nitro group, nitrile group, an alkoxyl group, acyl group, sulfone group, hydroxyl group or a halogen atom on its benzene ring. Among the styrene-based monomers, styrene, the alkyl styrene having an alkyl group of 1 to 4 carbon atoms and the alkoxy styrene having an alkoxy group of 1 to 4 carbon atoms are preferable, styrene and the alkyl styrene having an alkyl group of 1 to 4 carbon atoms are more preferable, styrene and the alkyl styrene having an alkyl group of 1 or 2 carbon atoms are furthermore preferable, and styrene is even more preferable, from the viewpoint of improvement in scratch resistance, adhesion property to a substrate and blocking resistance of the water-based ink.

The epoxy group-containing monomer includes, for example, epoxy group-containing (meth)acrylates such as glycidyl (meth)acrylate, α-methylglycidyl (meth)acrylate, glycidyl allyl ether, 3,4-epoxycyclohexylmethyl (meth)acrylate, and the like. The present invention is not limited only to those exemplified ones. These monomers can be used alone or in combination of two or more kinds thereof, respectively.

The silane group-containing monomer includes, for example, vinyltrimethoxysilane, vinyltriethoxysilane, vinyltri(methoxyethoxy)silane, γ-(meth)acryloyloxypropyltrimethoxysilane, 2-styrylethyltrimethoxysilane, vinyltrichlorosilane, γ-(meth)acryloyloxypropyl hydroxysilane, γ-(meth)acryloyloxypropylmethylhydroxysilane, and the like. The present invention is not limited only to those exemplified ones. These monomers can be used alone or in combination of two or more kinds thereof, respectively.

The carbonyl group-containing monomer includes, for example, acrolein, formyl styrol, vinyl ethyl ketone, a (meth)acryloyloxyalkyl propenal, acetonyl (meth)acrylate, diacetone (meth)acrylate, 2-hydroxypropyl (meth)acrylate acetyl acetate, butanediol-1,4-acrylate acetyl acetate, oxocyclohexylmethyl (meth)acrylate, and the like. The present invention is not limited only to those exemplified ones. These monomers can be used alone or in combination of two or more kinds thereof, respectively.

Specific examples of the polyfunctional monomer other than the nitrogen atom-containing monomer include an ethylenically unsaturated polyfunctional monomer other than the nitrogen atom-containing monomer. Incidentally, the ethylenically unsaturated polyfunctional monomer is a monomer having two or more ethylenically unsaturated double bonds.

The polyfunctional monomer other than the nitrogen atom-containing monomer includes, for example, polyfunctional (meth)acrylates such as di(meth)acrylates of a polyhydric alcohol having 1 to 10 carbon atoms, such as ethylene glycol di(meth)acrylate, propylene glycol di(meth)acrylate, 1,3-butanediol di(meth)acrylate, 1,4-butanediol di(meth)acrylate, 1,6-hexanediol di(meth)acrylate, ethylene oxide-modified 1,6-hexanediol di(meth)acrylate, 1,9-nonandiol di(meth)acrylate and propylene oxide-modified neopentyl glycol di (meth)acrylate; alkylene oxide di(meth)acrylates having an alkylene oxide group of 2 to 4 carbon atoms wherein the number of moles of the alkylene oxide group is 2 to 50 moles, such as polyethylene glycol di(meth)acrylate wherein the number of moles of ethylene oxide is 2 to 50 moles, polypropylene glycol di(meth)acrylate wherein the number of moles of propylene oxide is 2 to 50 moles and tripropyleneglycol di(meth)acrylate; tri(meth)acrylates of a polyhydric alcohol having 1 to 10 carbon atoms, such as ethoxylated glycerol tri(meth)acrylate, propylene oxide-modified glycerol tri(meth)acrylate, ethylene oxide-modified trimethylolpropane tri(meth)acrylate, trimethylolpropane tri(meth)acrylate, pentaerythritol monohydroxy tri (meth)acrylate and trimethylolpropane triethoxy tri(meth) acrylate; tetra(meth)acrylates of a polyhydric alcohol having 1 to 10 carbon atoms, such as pentaerythritol tetra(meth) acrylate, dipentaerythritol tetra(meth)acrylate and ditrimethylolpropane tetra(meth)acrylate; penta(meth)acrylates of a polyhydric alcohol having 1 to 10 carbon atoms, such as pentaerythritol penta(meth)acrylate and dipentaerythritol (monohydroxy) penta(meth)acrylate; hexa(meth)acrylates of a polyhydric alcohol having 1 to 10 carbon atoms, such as pentaerythritol hexa(meth)acrylate; and the like. The present invention is not limited only to those exemplified ones. These polyfunctional monomers can be used alone or in combination of two or more kinds thereof, respectively.

In the present invention, an ultraviolet absorbing monomer and the like can be included in the monomer component within a scope which would not hinder an object of the present invention from the viewpoint of imparting of ultraviolet absorption to the emulsion particles.

It is preferred that the monomer component includes the alkyl (meth)acrylate, the hydroxyl group-containing (meth) acrylate and the styrene-based monomer; and it is more preferred that that the monomer component includes the alkyl (meth)acrylate having an alkyl group of 1 to 8 carbon atoms, the hydroxyalkyl (meth)acrylate having an alkyl group of 2 to 4 carbon atoms and styrene; from the viewpoint of obtaining a water-based ink being comprehensively excellent in scratch resistance, adhesion property to a substrate and blocking resistance.

The content of the alkyl (meth)acrylate in the monomer component is preferably 35 to 85% by mass, and more preferably 40 to 80 by mass, from the viewpoint of improvement in scratch resistance, adhesion property to a substrate and blocking resistance of the water-based ink. The content of the alkyl (meth)acrylate having an alkyl group of 1 to 3 carbon atoms, preferably methyl (meth)acrylate is preferably 10 to 60% by mass, and more preferably 15 to 55% by mass, from the viewpoint of improvement in scratch resistance, adhesion property to a substrate and blocking resistance of the water-based ink. In addition, the content of the alkyl (meth)acrylate having an alkyl group of 4 to 8 carbon atoms in the monomer component is preferably 10 to 40% by mass, and more preferably 15 to 35% by mass, from the viewpoint of improvement in scratch resistance, adhesion property to a substrate and blocking resistance of the water-based ink.

The content of the hydroxyl group-containing (meth) acrylate in the monomer component is preferably 0.3 to 25% by mass, more preferably 0.5 to 20% by mass, and furthermore preferably 0.5 to 15% by mass, from the viewpoint of improvement in scratch resistance, adhesion property to a substrate and blocking resistance of the water-based ink.

The content of the styrene-based monomer in the monomer component is preferably 5 to 55% by mass, and more preferably 10 to 50% by mass, from the viewpoint of improvement in scratch resistance, adhesion property to a substrate and blocking resistance of the water-based ink.

The carboxyl group-containing monomer represented by (meth)acrylic acid and the like can be included in the monomer component. The content of the carboxyl group-containing monomer in the monomer component is preferably 3% by mass or less, and more preferably 1% by mass or less, from the viewpoint of improvement in scratch resistance, adhesion property to a substrate and blocking resistance of the water-based ink, and its lower limit is 0% by mass.

A method for carrying out an emulsion polymerization of the monomer component includes, for example, a method includes dissolving an emulsifier in a medium such as an aqueous medium containing water and a water-soluble organic solvent such as a lower alcohol represented by methanol, or water, and adding dropwise the monomer component and a polymerization initiator thereto under stirring; a method includes adding dropwise a monomer component which has been previously pre-emulsified with an emulsifier and water to water or an aqueous medium; and the like. The present invention is not limited only to those exemplified methods. Incidentally, the amount of the medium can be appropriately determined in consideration of an amount of non-volatile component included in a resulting resin emulsion. The medium can be previously charged in a reaction vessel, or can be used in the form of a pre-emulsion. In addition, the medium can be used during carrying out of an emulsion polymerization to prepare a resin emulsion as occasion demands.

When the emulsion polymerization of the monomer component is carried out, the emulsion polymerization can be carried out after blending the monomer component, the emulsifier and the medium; the emulsion polymerization can be carried out after blending the monomer component, the emulsifier and the medium with stirring to prepare a pre-emulsion; or the emulsion polymerization can be carried out after blending at least one of the monomer component, the emulsifier and the medium with a pre-emulsion made of the remaining of the monomer component, the emulsifier and the medium. The monomer component, the emulsifier and the medium can be added at a time or separately, or can be continuously added dropwise.

A resin emulsion is obtained by carrying out an emulsion polymerization of the monomer component as mentioned above. When an outer layer is formed on the surface of the emulsion particle included in the resin emulsion obtained in the above, the outer layer can be formed on the surface of the emulsion particle by carrying out an emulsion polymerization of the monomer component in the resin emulsion in the same manner as mentioned above. In addition, when another outer layer is further formed on the surface of the emulsion particle on which the outer layer has been formed, another outer layer can be formed on the surface of the emulsion particle by carrying out an emulsion polymerization of the monomer component in the resin emulsion in the same manner as mentioned above. A resin emulsion containing emulsion particles having a multi-layer structure can be prepared by a multi-stage emulsion polymerization method as mentioned above.

The emulsifier includes, for example, an anionic emulsifier, a nonionic emulsifier, a cationic emulsifier, an amphoteric emulsifier, a polymeric emulsifier, and the like. These emulsifiers can be used alone or in combination of two or more kinds thereof, respectively.

The anionic emulsifier includes, for example, alkyl sulfate salts such as ammonium dodecyl sulfate and sodium dodecyl sulfate; alkyl sulfonate salts such as ammonium dodecyl sulfonate, sodium dodecyl sulfonate and sodium alkyldiphenyl ether disulfonate; alkylaryl sulfonate salts such as ammonium dodecylbenzene sulfonate and sodium dodecyl naphthalene sulfonate; polyoxyethylene alkyl sulfonate salts; polyoxyethylene alkyl sulfate salts; polyoxyethylene alkylaryl sulfate salts; dialkyl sulfosuccinic acid salts; arylsulfonic acid-formaldehyde condensate; fatty acid salts such as ammonium laurylate and sodium stealylate; sulfate esters having an allyl group or salts thereof, such as bis (polyoxyethylene polycyclic phenyl ether) (meth)acrylate sulfonate salt, propenyl-alkyl sulfosuccinate salt, (meth) acrylic acid polyoxyethylene sulfonate salt, (meth)acrylic acid polyoxyethylene phosphonate salt and a sulfonate salt of allyloxymethylalkyloxypolyoxyethylene; a polyoxyethylene alkylphenyl ether sulfate salt, sulfate salt of an allyloxymethylalkoxyethyl polyoxyethylene, a polyoxyalkylene alkenyl ether ammonium sulfate salt, and the like. The present invention is not limited only to those exemplified ones.

The nonionic emulsifier includes, for example, a polyoxyethylene alkyl ether, a polyoxyethylene alkylaryl ether, a condensate of polyethylene glycol and polypropylene glycol, a sorbitan fatty acid ester, a polyoxyethylene sorbitan fatty acid ester, a fatty acid monoglyceride, a condensate of ethylene oxide and aliphatic amine, an allyloxymethylalkoxyethyl hydroxypolyoxyethylene, a polyoxyalkylene alkenyl ether, and the like. The present invention is not limited only to those exemplified ones.

The cationic emulsifier includes, for example, alkylammonium salts such as dodecylammonium chloride, and the like. The present invention is not limited only to those exemplified ones.

The amphoteric emulsifier includes, for example, a betaine ester-type emulsifier and the like. The present invention is not limited only to those exemplified ones.

The polymeric emulsifier includes, for example, poly(meth)acrylic acid salts such as sodium polyacrylate; polyvinyl alcohol; polyvinylpyrrolidone; polyhydroxyalkyl (meth)acrylates such as polyhydroxyethyl acrylate; a copolymer made of a copolymerizable component including at least one monomer which constitutes the above polymeric emulsifier, and the like. The present invention is not limited only to those exemplified ones.

In addition, an emulsifier having a polymerizable group, that is, a so-called reactive emulsifier is preferred from the viewpoint of improvement in scratch resistance, adhesion property to a substrate and blocking resistance of the water-based ink, and a non-nonylphenyl-type emulsifier is preferred from the viewpoint of environmental protection.

The reactive emulsifier includes, for example, a propenyl-alkylsulfosuccinate salt, a (meth)acrylic acid polyoxyethylene sulfonate salt, a polyoxyethylene alkylpropenylphenyl ether ammonium sulfate [for example, trade name: Aqualon HS-10 and Aqualon BC-10 manufactured by Daiichi Kogyo Seiyaku Co., Ltd., and the like], an allyloxymethylalkyloxypolyoxyethylene sulfonate salt [for example, trade name: Aqualon KH-10 manufactured by Daiichi Kogyo Seiyaku Co., Ltd., and the like], an allyloxymethylnonylphenoxyethyl hydroxypolyoxyethylene sulfonate salt [for example, trade name: ADEKA REASOAP SE-10 manufactured by ADEKA CORPORATION, and the like], an allyloxymethylalkoxyethyl hydroxypolyoxyethylene sulfate salt [for example, trade name: ADEKA REASOAP SR-10, SR-20 and SR-30 manufactured by ADEKA CORPORATION, and the like], a bis(polyoxyethylene polycyclic phenyl ether) methacrylated sulfonate salt [for example, trade name: ANTOX MS-60 manufactured by NIPPON NYUKAZAI CO., LTD., and the like], an allyloxymethylalkoxyethyl hydroxypolyoxyethylene [for example, trade name: ADEKA REASOAP ER-10, ER-20, ER-30 and ER-40 manufactured by ADEKA CORPORATION, and the like], a polyoxyethylene alkoxypropenyl phenyl ether [for example, trade name: Aqualon RN-20 manufactured by Daiichi Kogyo Seiyaku Co., Ltd., and the like], an allyloxymethylnonylphenoxyethyl hydroxypolyoxyethylene [for example, trade name: ADEKA REASOAP NE-10, NE-20 and NE-30 manufactured by ADEKA CORPORATION, and the like], and the like. The present invention is not limited only to those exemplified ones. These reactive emulsifiers can be used alone or in combination of two or more kinds thereof, respectively.

The amount of the emulsifier per 100 parts by mass of the monomer component is preferably 0.01 part by mass or more, more preferably 0.5 part by mass or more, and furthermore preferably 1 part by mass or more, from the viewpoint of improvement in polymerization stability. The amount of the emulsifier per 100 parts by mass of the monomer component is preferably 20 parts by mass or less, more preferably 15 parts by mass or less, and furthermore preferably 12 parts by mass or less, from the viewpoint of improvement in scratch resistance, adhesion property to a substrate and blocking resistance of the water-based ink. Therefore, the amount of the emulsifier per 100 parts by mass of the monomer component is preferably 0.01 to 20 parts by mass, more preferably 0.5 to 15 parts by mass, and furthermore preferably 1 to 12 parts by mass, from the viewpoint of improvement in polymerization stability, scratch resistance, adhesion property to a substrate and blocking resistance of the water-based ink.

When the monomer component is polymerized, it is preferred to use a polymerization initiator. The polymerization initiator includes, for example, azo compounds such as azobisisobutyronitrile, 2,2-azobis(2-methylbutyronitrile), 2,2-azobis(2,4-dimethylvaleronitrile), 2,2-azobis (2-diaminopropane) hydrochloride, 4,4-azobis(4-cyanovaleric acid) and 2,2-azobis(2-methylpropionamidine); persulfates such as potassium persulfate; peroxides such as hydrogen peroxide, benzoyl peroxide, parachlorobenzoyl peroxide, lauroyl peroxide and ammonium peroxide; and the like. The present invention is not limited only to those exemplified ones. These polymerization initiators can be used alone or in combination of two or more kinds thereof, respectively.

The amount of the polymerization initiator per 100 parts by mass of the monomer component is preferably 0.01 part by mass or more, more preferably 0.05 part by mass or more, and furthermore preferably 0.1 part by mass or more, from the viewpoint of increase of a polymerization rate and reduction of a remaining amount of unreacted monomers. The amount of the polymerization initiator per 100 parts by mass of the monomer component is preferably 1 part by mass or less, more preferably 0.8 parts by mass or less, and furthermore preferably 0.5 parts by mass or less, from the viewpoint of improvement in scratch resistance, adhesion property to a substrate and blocking resistance of the water-based ink. Therefore, the amount of the polymerization initiator per 100 parts by mass of the monomer component is preferably 0.01 to 1 part by mass, more preferably 0.05 to 0.8 parts by mass, and furthermore preferably 0.1 to 0.5 parts by mass, from the viewpoint of improvement in polymerization rate, reduction of the residual amount of the unreacted monomer, scratch resistance, adhesion property to a substrate and blocking resistance of the water-based ink.

A method for adding the polymerization initiator is not particularly limited. The method for adding the polymerization initiator includes, for example, a batch charging method, a split charging method, a continuous dropping method, and the like. In addition, a part of the polymerization initiator can be added to the reaction system before or after the termination of adding of the monomer component from the viewpoint of acceleration of the ending point of the polymerization reaction.

Incidentally, in order to promote the decomposition of the polymerization initiator, for example, a reducing agent such as sodium bisulfite or a decomposition agent of the polymerization initiator, such as a transition metal salt such as ferrous sulfate can be added to the reaction system in an appropriate amount.

In addition, a chain transfer agent can be used in a monomer component in order to adjust the molecular weight of the polymer which constitutes the emulsion particles. When the chain transfer agent is used in the monomer component, the molecular weight of the polymer which constitutes the emulsion particles can generally be reduced as compared with the case where the chain transfer agent is not used in the monomer component.

The chain transfer agent includes, for example, 2-ethylhexyl thioglycolate, tert-dodecyl mercaptan, n-octyl mercaptan, n-dodecyl mercaptan, mercaptoacetic acid, β-mercaptopropionic acid, 2-mercaptoethanol, α-methylstyrene, α-methylstyrene dimer, phosphorous acid, hypophosphoric acid, sodium hypophosphite, potassium hypophosphite, and the like. The present invention is not limited only to those exemplified ones. These chain transfer agents can be used alone or in combination of two or more kinds thereof, respectively. The amount of the chain transfer agent per 100 parts by mass of the monomer component is preferably 0.01 to 10 parts by mass from the viewpoint of adjusting the molecular weight of the polymer which constitutes the emulsion particles.

An additive such as a pH buffer, a chelating agent or a film-forming auxiliary can be added to the reaction system when the polymerization of the monomer component is carried out. The amount of the additive varies depending on the kind of the additive, the amount of the additive cannot be absolutely determined. The amount of the additive per 100 parts by mass of the monomer component is usually preferably 0.01 to 5 parts by mass or so, and more preferably 0.1 to 3 parts by mass or so.

The atmosphere where the emulsion-polymerization of the monomer component is carried out is not particularly limited. It is preferred that the atmosphere is an inert gas such as nitrogen gas from the viewpoint of increase in efficiency of a polymerization reaction.

The polymerization temperature during the emulsion polymerization of the monomer component is not particularly limited. The polymerization temperature is usually preferably 10 to 100° C., more preferably 40 to 95° C., and furthermore preferably 50 to 60° C. The polymerization temperature can be constant, or can be changed during the polymerization reaction.

The polymerization time for emulsion polymerization of the monomer component is not particularly limited. The polymerization time for emulsion polymerization of the monomer component can be appropriately adjusted in accordance with the progress of the polymerization reaction. The polymerization time for emulsion polymerization of the monomer component is usually 2 to 8 hours or so.

Incidentally, when the emulsion-polymerization of the monomer component is carried out, a part or all of the acidic groups of the resulting polymer can be neutralized with a neutralizing agent. The neutralizing agent can be used, for example, after final addition of the monomer component, between the first-stage polymerization reaction and the second-stage polymerization reaction, or at the time when the initial emulsion polymerization reaction is completed.

The neutralizing agent includes, for example, alkaline substances such as alkali metal hydroxides such as sodium hydroxide and alkaline earth metal hydroxides; alkali metal carbonates such as calcium carbonate, and alkaline earth metal carbonates; ammonium; organic amines such as monomethylamine; and the like. The present invention is not limited only to those exemplified ones. Among the neutralizing agents, a volatile alkaline substance such as ammonium is preferable from the viewpoint of obtaining a water-based ink being comprehensively excellent in scratch resistance, adhesion property to a substrate and blocking resistance. The neutralizing agent can be used in the form of an aqueous solution.

In addition, when the emulsion-polymerization of the monomer component is carried out, a silane coupling agent can be used in an appropriate amount from the viewpoint of improvement in scratch resistance, adhesion property to a substrate and blocking resistance of the water-based ink. The silane coupling agent includes, for example, a silane coupling agent having a polymerizable unsaturated group such as (meth)acryloyl group, vinyl group, allyl group or propenyl group, and the like. The present invention is not limited only to those exemplified ones.

A resin emulsion containing emulsion particles can be obtained by carrying out the emulsion polymerization of the monomer component as described above. The polymer which constitutes the emulsion particles may have a cross-linked structure.

The emulsion particles included in the resin emulsion may have a single resin layer prepared by one-stage emulsion polymerization, or plural resin layers prepared by plural stages of emulsion polymerization. The emulsion particles having a single resin layer can be prepared by carrying out an emulsion polymerization of the monomer component. In addition, the emulsion particles having plural resin layers can be prepared, for example, by carrying out a multi-stage emulsion polymerization including the steps of carrying out the emulsion polymerization of the monomer component for forming an inner layer, and carrying out the emulsion polymerization of the monomer component for forming an outer layer in the presence of the resulting emulsion particles, under the same polymerization method and polymerization conditions as in the case of the emulsion polymerization of the monomer component. When the outer layer is formed on the surface of the emulsion particle, it is desired that the emulsion-polymerization of the monomer component for forming the outer layer is carried out after the polymerization reaction ratio reaches 90% or more, preferably 95% or more in preparing the inner layer of the emulsion particle, from the viewpoint of formation of a layer-separated structure between the inner layer and the outer layer in the emulsion particle.

The number of resin layers which constitutes the emulsion particle is preferably 1 to 5, more preferably 1 to 3, furthermore preferably two or three layers, and even more preferably two layers, from the viewpoint of improvement in scratch resistance, adhesion property to a substrate and blocking resistance of the water-based ink. Among the emulsion particles, it is preferred that the emulsion particle has plural resin layers from the viewpoint of improvement in scratch resistance, adhesion property to a substrate and blocking resistance of the water-based ink. Incidentally, when the emulsion particle has plural resin layers, the boundary between the resin layers is not necessarily clear, and the adjacent resin layers can be mixed with each other.

In the emulsion particle having plural resin layers, it is preferred that a resin layer having the highest glass transition temperature is positioned inside the outermost resin layer from the viewpoint of improvement in scratch resistance, adhesion property to a substrate and blocking resistance of the water-based ink.

In the emulsion particle having two resin layers of an inner layer and an outer layer, the mass ratio of the resin layer which constitutes the inner layer to the resin layer which constitutes the outer layer (resin layer which constitutes inner layer/resin layer which constitutes outer layer) is preferably 10/90 to 90/10, more preferably 20/80 to 80/20, furthermore preferably 30/70 to 70/30, and even more preferably 40/60 to 60/40, from the viewpoint of improvement in scratch resistance, adhesion property to a substrate and blocking resistance of the water-based ink. In the emulsion particles having three resin layers of an inner layer, an intermediate layer and an outer layer, it is preferred that the content of the resin layer which constitutes the inner layer is 10 to 40% by mass, that the content of the resin layer which constitutes the intermediate layer is 20 to 60% by mass, and that the content of the resin layer which constitutes the outer layer is 20 to 60% by mass, from the viewpoint of improvement in scratch resistance, adhesion property to a substrate and blocking resistance of the water-based ink.

In the emulsion particle having a single resin layer, the glass transition temperature of the resin layer is preferably 0 to 50° C., more preferably 5 to 45° C., and furthermore preferably 10 to 40° C., from the viewpoint of improvement in scratch resistance, adhesion property to a substrate and blocking resistance of the water-based ink.

In the emulsion particles having two resin layers of an inner layer and an outer layer, the glass transition temperature of the resin layer which constitutes the inner layer is preferably 60 to 120° C., more preferably 70 to 110° C., and furthermore preferably 80 to 100° C., and that the glass transition temperature of the resin layer which constitutes the outer layer is preferably −45 to 15° C., more preferably −40 to 10° C., and furthermore preferably −35 to 5° C., from the viewpoint of improvement in scratch resistance, adhesion property to a substrate and blocking resistance of the water-based ink.

The glass transition temperature of the entire emulsion particle having plural resin layers is preferably −25 to 50° C., and more preferably −20 to 45° C., from the viewpoint of improvement in scratch resistance, adhesion property to a substrate and blocking resistance of the water-based ink. The glass transition temperature of the resin layer of the innermost layer of the emulsion particle having plural resin layers is preferably 60 to 120° C., more preferably 70 to 110° C., and furthermore preferably 80 to 100° C., from the viewpoint of improvement in scratch resistance, adhesion property to a substrate and blocking resistance of the water-based ink. It is preferred that the glass transition temperature of the resin layer of the innermost layer is higher than the glass transition temperature of the resin layers other than the innermost layer.

The glass transition temperature of the resin layer which constitutes the emulsion particles can be easily controlled by adjusting the kind and amount of the monomer used in the monomer component.

Incidentally, in the present description, the glass transition temperature (Tg) of the resin layer which constitutes the emulsion particle means a temperature as determined by using the glass transition temperature of a homopolymer of the monomer used in the monomer component which constitutes the resin layer, and calculating the glass transition temperature on the basis of the Fox equation represented by the formula:

$$1/Tg = \Sigma(Wm/Tgm)/100$$

wherein Wm is a content (% by mass) of the "monomer m" in the monomer component which constitutes the resin layer, and Tgm is a glass transition temperature (absolute temperature: K) of the homopolymer of the "monomer m".

In the present description, the glass transition temperature of the polymer of the resin layer which constitutes the emulsion particle means a glass transition temperature as determined on the basis of the FOX equation unless otherwise specified. The glass transition temperature of the entire resin layer which constitutes the emulsion particle having plural resin layers means a glass transition temperature as determined on the basis of the FOX equation by using the glass transition temperature of the homopolymer of the monomer used in the monomer component which constitutes the resin layers prepared in a multi-stage emulsion polymerization. Incidentally, when the glass transition temperature of a homopolymer made of a monomer such as a special monomer or a polyfunctional monomer is unknown, and the content of all of the monomers of which the glass transition temperature is unknown is 10% by mass or less in mass fraction, the glass transition temperature is determined by using only the monomer of which glass transition temperature is apparent. When the content of all of the monomers of which the glass transition temperature is unknown in the monomer component exceeds 10% by mass in mass fraction, the glass transition temperature of the polymer is determined by means of a differential scanning calorimetry (DSC), a differential thermal analysis (DTA), a thermomechanical analysis (TMA) and the like.

The glass transition temperature of the polymer is, for example, 105° C. for methyl methacrylate homopolymer, −70° C. for 2-ethylhexyl acrylate homopolymer, −56° C. for n-butyl acrylate homopolymer, 20° C. for n-butyl methacrylate homopolymer, 55° C. for 2-hydroxyethyl methacrylate homopolymer, 95° C. for acrylic acid homopolymer, 130° C. for methacrylic acid homopolymer, 100° C. for styrene homopolymer, 130° C. for 4-methacryloyloxy-2,2,6,6-tetramethylpiperidine homopolymer, 130° C. for 4-methacryloyloxy-1,2,2,6,6-pentamethylpiperidine homopolymer, 83° C. for cyclohexylmethacrylate homopolymer, and 18° C. for dimethylaminoethyl methacrylate homopolymer.

The weight average molecular weight of the polymer of the resin layer which constitutes the emulsion particle is preferably 100000 or more, more preferably 300000 or more, furthermore preferably 400000 or more, and even more preferably 500000 or more, from the viewpoint of improvement in scratch resistance, adhesion property to a substrate and blocking resistance of the water-based ink. When the polymer of the resin layer which constitutes the emulsion particles has a crosslinked structure, the upper limit of the weight average molecular weight of the polymer is not particularly limited, because it is difficult to determine the weight average molecular weight of the polymer. When the polymer of the resin layer which constitutes the emulsion particle does not have a crosslinked structure, it is preferred that the upper limit of the weight average molecular weight of the polymer is 4000000 or less from the viewpoint of improvement in scratch resistance, adhesion property to a substrate and blocking resistance of the water-based ink. Therefore, the weight average molecular weight of the polymer of the resin layer which constitutes the emulsion particle is preferably 100000 to 4000000, more preferably 300000 to 4000000, furthermore preferably 400000 to 4000000, and even more preferably 500000 to 4000000, from the viewpoint of improvement in scratch resistance, adhesion property to a substrate and blocking resistance of the water-based ink.

The weight average molecular weight of the polymer of the resin layer which constitutes the emulsion particle means a weight average molecular weight (polystyrene conversion) determined by using a chart of a gel permeation chromatography obtained by means of a gel permeation chromatography equipped with an RI (differential refractometry) detector [product number: HLC-8120GPC manufactured by TOSOH CORPORATION, column: TSKgel G-5000HXL and TSKgel GMHXL-L being connected with each other in series, eluent tetrahydrofuran (THF)], and a calibration curve prepared by using standard polystyrene F-450, A-5000, A-1000 and A-300 manufactured by TOSOH CORPORATION.

The average particle diameter of the emulsion particles is preferably 50 nm or more, and more preferably 100 nm or more, from the viewpoint of improvement in the mechanical stability of the emulsion particles. The average particle diameter of the emulsion particles is preferably 400 nm or less, and more preferably 350 nm or less, from the viewpoint of improvement in scratch resistance, adhesion property to a substrate and blocking resistance of the water-based ink. Therefore, the average particle diameter of the emulsion particles is preferably 50 to 400 nm, and more preferably 100 to 350 nm. Incidentally, in the present invention, the average particle diameter of the emulsion particles is a value as determined by using a cumulant method with a particle size distribution measuring device [manufactured by OTSUKA ELECTRONICS Co., LTD. under the product number: FPAR-1000] based on a dynamic light scattering method.

The content of non-volatile component in the resin emulsion is preferably 10% by mass or more, and more preferably 20% by mass or more, from the viewpoint of improvement in productivity of the water-based ink. The content of the non-volatile component in the resin emulsion is preferably 70% by mass or less, and more preferably 60% by mass or less, from the viewpoint of improvement in handleability of the water-based ink. Therefore, the content of the non-volatile component in the resin emulsion is preferably 10 to 70% by mass, and more preferably 20 to 60% by mass. In the present invention, the content of the non-volatile component of the resin emulsion is determined by weighing 1 g of the resin emulsion, drying 1 g of the resin emulsion in a hot air dryer at a temperature of 120° C. for 1 hour, to give a dried residue as a non-volatile component, and determining the content of the non-volatile component on the basis of the equation:

[Content of non-volatile component in resin emulsion (% by mass)]=([Mass of dried residue]÷[1 g of resin emulsion])×100.

The minimum film-forming temperature of the resin emulsion is preferably 80° C. or lower, more preferably 70° C. or lower, and furthermore preferably 60° C. or lower, from the viewpoint of improvement in adhesion property to a substrate. The minimum film-forming temperature of the resin emulsion is preferably −5° C. or higher, more preferably 5° C. or higher, and furthermore preferably 10° C. or higher, from the viewpoint of improvement in water resistance and blocking resistance. Therefore, the minimum film-forming temperature of the resin emulsion is preferably −5 to 80° C., more preferably 5 to 70° C., and furthermore preferably 10 to 60° C. Incidentally, the minimum film-forming temperature of the resin emulsion means a temperature at which a crack occurs in a film when the film is formed by applying the resin emulsion to a glass plate placed on a thermal gradient tester with an applicator so that the thickness of the film is 0.2 mm, and the film is dried by heating.

The resin emulsion obtained as mentioned above can be suitably used as a resin emulsion for a water-based ink of the present invention.

The resin emulsion for a water-based ink according to the present invention can be easily prepared by mixing the resin emulsion with the carboxylic acid polymer non-metal salt.

In the present invention, one of the features according to the present invention resides in that the resin emulsion for a water-based ink contains a carboxylic acid polymer non-metal salt. Since the resin emulsion for a water-based ink according to the present invention contains the carboxylic acid polymer non-metal salt, a water-based ink being comprehensively excellent in scratch resistance, adhesion property to a substrate and blocking resistance can be obtained by using the resin emulsion for a water-based ink.

The carboxylic acid polymer salt includes, for example, a metal salt of a carboxylic acid polymer, such as sodium salt of a carboxylic acid polymer. However, since a water-based ink containing the metal salt of the carboxylic acid polymer is inferior in scratch resistance and blocking resistance, the water-based ink containing the metal salt of the carboxylic acid polymer cannot solve technical problems in the present invention.

On the other hand, since the resin emulsion for a water-based ink according to the present invention contains a non-metal salt of a carboxylic acid polymer, the resin emulsion for a water-based ink according to the present invention exhibits not only excellent adhesion property to a substrate but also excellent scratch resistance and excellent blocking resistance, as compared with a case where the metal salt of the carboxylic acid polymer is used in the resin emulsion for a water-based ink.

As a raw material of the carboxylic acid polymer non-metal salt, a carboxylic acid polymer is used. The carboxylic acid polymer means a polymer having a carboxyl group. The carboxylic acid polymer can be obtained, for example, by polymerizing a monomer component containing an unsaturated carboxylic acid having a carboxyl group. The unsaturated carboxylic acid includes an unsaturated monobasic acid and an unsaturated polybasic acid. The unsaturated monobasic acid includes, for example, acrylic acid, methacrylic acid and the like, and the present invention is not limited only to those exemplified ones. The unsaturated polybasic acid includes, for example, maleic acid, fumaric acid, itaconic acid and the like, and the present invention is not limited only to those exemplified ones.

The monomer component containing the unsaturated carboxylic acid having a carboxyl group can be composed only of the unsaturated carboxylic acid having a carboxyl group, or may contain a radically polymerizable monomer other than the unsaturated carboxylic acid having a carboxyl group within a scope which would not hinder an object of the present invention. The radically polymerizable monomer includes, for example, unsaturated carboxylic acid alkyl esters such as methyl (meth)acrylate, aromatic unsaturated compounds such as styrene, vinyl esters such as vinyl acetate, unsaturated nitrile compounds such as acrylonitrile, and the like. The present invention is not limited only to those exemplified ones.

The carboxylic acid polymer can be obtained by polymerizing a monomer component containing the unsaturated carboxylic acid having a carboxyl group, or can be commercially available. The commercially available carboxylic acid polymer includes, for example, trade name: AQUALIC HL-415 manufactured by NIPPON SHOKUBAI CO., LTD., trade name: JURYMER AC-10SL manufactured by TOA-GOSEI CO., LTD., trade name: MARIALIM AKM-0531 manufactured by NOF CORPORATION, and the like. The present invention is not limited only to those exemplified ones.

The carboxylic acid polymer non-metal salt can be easily prepared, for example, by neutralizing the carboxyl group of the carboxylic acid polymer with a non-metal base. The non-metal salt includes, for example, an ammonium salt, an organic ammonium salt, an amine salt, and the like. The present invention is not limited only to those exemplified ones.

The organic ammonium salt includes, for example, a methylammonium salt, an ethylammonium salt, a dimethylammonium salt, a diethylammonium salt, a trimethylammonium salt, a triethylammonium salt, and the like. The present invention is not limited only to those exemplified ones.

The amine salt includes, for example, trialkylamine salts having an alkyl group of 1 to 4 carbon atoms, such as a trimethylamine salt, a triethylamine salt and a tributylamine salt; trialkanolamine salts having an alkanol group of 1 to 4 carbon atoms, such as an ethanolamine salt, a diethanolamine salt, a triethanolamine salt, a monoisopropanolamine salt, a diisopropanolamine salt and a triisopropanolamine salt; a hydroxyethyldiisopropanolamine salt, a dihydroxyethylisopropanolamine salt, a tetrakis(2-hydroxypropyl)ethylenediamine salt, a pentakis(2-hydroxypropyl)diethylenetriamine salt, and the like. The present invention is not limited only to those exemplified ones.

Among the non-metal salts, the ammonium salt and the amine salt are preferable, and the ammonium salt and the trialkylamine salt having 1 to 4 carbon atoms are more preferable, from the viewpoint of improvement in scratch resistance, adhesion property to a substrate and blocking resistance of the water-based ink.

The weight average molecular weight of the carboxylic acid polymer non-metal salt is preferably 500 or more, and more preferably 1000 or more, from the viewpoint of improvement in scratch resistance, adhesion property to a substrate and blocking resistance of the water-based ink. The weight average molecular weight of the carboxylic acid polymer non-metal salt is preferably 50000 or less, and more preferably 20000 or less, from the viewpoint of improvement in scratch resistance, adhesion property to a substrate and blocking resistance of the water-based ink. Therefore, the weight average molecular weight of the carboxylic acid polymer non-metal salt is preferably 500 to 50000, and more preferably 1000 to 20000. Incidentally, the weight average molecular weight of the carboxylic acid polymer non-metal salt is a weight average molecular weight obtained from a calibration curve of standard sodium polyacrylate using a gel permeation chromatography.

The acid value of the carboxylic acid polymer non-metal salt, more specifically the acid value of the non-volatile component of the carboxylic acid polymer non-metal salt is not particularly limited. The acid value of the carboxylic acid polymer non-metal salt is preferably 300 to 600 mgKOH/g from the viewpoint of improvement in scratch resistance, adhesion property to a substrate and blocking resistance of the water-based ink. The acid value of the carboxylic acid polymer non-metal salt is a number of mg of potassium hydroxide required for neutralizing 1 g of the carboxylic acid polymer non-metal salt. The acid value of the carboxylic acid polymer non-metal salt is a value as determined in accordance with a method described in JIS K0070.

The carboxylic acid polymer non-metal salt can be obtained by neutralizing the carboxyl group of the carboxylic acid polymer with a non-metal base, or can be commercially available. The commercially available carboxylic acid polymer non-metal includes, for example, trade name: Aron A-30SL and Aron A-6114 manufactured by TOAGOSEI CO., LTD., trade name: SN DISPERSANT 5020, SN DISPERSANT 5023 and NOPCO SPERSE 6100 manufactured by SAN NOPCO LIMITED, and the like. The present invention is not limited only to those exemplified ones.

The amount of the carboxylic acid polymer non-metal salt per 100 parts by mass of the non-volatile component of the resin emulsion is preferably 0.3 to 10 by mass, and more preferably 1 to 5 parts by mass, from the viewpoint of improvement in scratch resistance, adhesion property to a substrate and blocking resistance of the water-based ink.

The mass ratio of the nitrogen-containing monomer to the carboxylic acid polymer non-metal salt (nitrogen-containing monomer/carboxylic acid polymer non-metal salt) is preferably 1/99 to 99/1, more preferably 5/95 to 95/5, furthermore preferably 10/90 to 90/10, and even more preferably 10/50 to 50/10, from the viewpoint of improvement in scratch resistance, adhesion property to a substrate and blocking resistance of the water-based ink.

The water-based ink according to the present invention contains the resin emulsion for a water-based ink and a colorant. The hue of the colorant includes, for example, achromatic colors such as white, black and gray, and chromatic colors such as yellow, magenta, cyan, blue, red, orange and green. The present invention is not limited only to those exemplified ones.

The colorant includes a pigment and a dye. Among the colorants, the pigment is preferable because the pigment is excellent in weather resistance. When the pigment is used as the colorant, the pigment can be used in the form of a pigment dispersion such as a paste. The pigment includes an organic pigment and an inorganic pigment. The organic pigment and the inorganic pigment can be used alone or in combination, respectively.

The organic pigment includes, for example, azo pigments such as benzidine and hansa yellow; an azomethine pigment; a methine pigment; an anthraquinone pigment; phthalocyanine pigments such as phthalocyanine blue; a perinone pigment; a perylene pigment; a diketopyrrolopyrrole pigment; a thioindigo pigment; an iminoisoindoline pigment; an iminoisoindolinone pigment; quinacridone pigments such as a quinacridone red and a quinacridone violet; a flavantron pigment; an indantron pigment; an anthrapyrimidine pigment; a carbazole pigment; a monoarylide yellow; a diarylide yellow; a benzoimidazolone yellow; a trill orange; a naphthol orange; a quinophthalone pigment, and the like. The present invention is not limited only to those exemplified ones. These organic pigments can be used alone or in combination of two or more kinds thereof, respectively. The preferred organic pigment includes, for example, C.I. pigment yellow, C.I. pigment red, C.I. pigment orange, C.I. pigment violet, C.I. pigment blue, C.I. pigment green, and the like.

The inorganic pigment includes, for example, titanium dioxide, antimony trioxide, zinc flower, lithopone, lead white, red iron oxide, black iron oxide, iron oxide, chromium oxide green, carbon black, yellow lead, molybdenum red, ferric ferrocyanide (prussian blue), ultramarine, lead chromate, flat pigments such as mica, clay, aluminum powder, talc and aluminum silicate; extender pigments such as calcium carbonate, magnesium hydroxide, aluminum hydroxide, barium sulfate and magnesium carbonate; and the like. The present invention is not limited only to those exemplified ones. These inorganic pigments can be used alone or in combination of two or more kinds thereof, respectively.

The average particle diameter of the pigment is preferably 30 nm or more, and more preferably 50 nm or more, from the viewpoint of improvement in the dispersion stability in the water-based ink. The average particle diameter of the pigment is preferably 200 nm or less, and more preferably 150 nm or less, from the viewpoint of prevention of nozzle clogging and enhancing of ejection stability of the water-based ink from a nozzle head when the pigment is used in a water-based ink for inkjet printing. Therefore, the average particle diameter of the pigment is preferably 30 to 200 nm, and more preferably 50 to 150 nm. Incidentally, the average particle diameter of the pigment means a volume average particle diameter as determined by means of a particle size distribution measuring device [manufactured by Beckman Coulter Inc. under the product number: LS13320] using a laser diffraction/scattering method.

The dye includes, for example, C.I. solvent black, C.I. solvent red, C.I. solvent yellow, C.I. solvent blue, C.I. solvent green, C.I. solvent orange, C.I. solvent violet, and the like. The present invention is not limited only to those exemplified ones.

The amount of the colorant per 100 parts by mass of the non-volatile component of the resin emulsion for a water-based ink is preferably 50 parts by mass or more, and more preferably 100 parts by mass or more, from the viewpoint of sufficient coloring of a print or an image formed by the water-based ink. The amount of the colorant per 100 parts by mass of the non-volatile component of the resin emulsion for a water-based ink is preferably 300 parts by mass or less, and more preferably 200 parts by mass or less, from the viewpoint of formation of a uniform water-based ink coating film. Therefore, the amount of the colorant per 100 parts by mass of the non-volatile component of the resin emulsion for a water-based ink is preferably 50 to 300 parts by mass, and more preferably 100 to 200 parts by mass.

Incidentally, the water-based ink may contain a solvent such as water, a water-soluble organic solvent, or a mixed solvent of water and the water-soluble organic solvent, from the viewpoint of improvement in the dispersibility of the colorant in the water-based ink.

The water-soluble organic solvent includes, for example, polyhydric alcohols such as diethylene glycol, triethylene glycol, tetraethylene glycol, propylene glycol, 1,3-propanediol, glycerol, dipropylene glycol and tripropylene glycol; ethylene glycol monoethers such as ethylene glycol monomethyl ether, ethyleneglycol monoethyl ether, ethylene glycol monopropyl ether, ethylene glycol monoisopropyl ether, ethylene glycol monobutyl ether and ethylene glycol monoisobutyl ether; diethylene glycol monoethers such as diethylene glycol monomethyl ether, diethylene glycol monoethyl ether, diethylene glycol monopropyl ether, diethylene glycol monoisopropyl ether, diethylene glycol monobutyl ether and diethylene glycol monoisobutyl ether; polyethylene glycol monoethers such as propylene glycol monomethyl ether, propylene glycol monoethyl ether, propylene glycol monopropyl ether, propylene glycol monoisopropyl ether, propylene glycol monobutyl ether and propylene glycol monoisobutyl ether; polyethylene glycol monoethers such as polyethylene glycol monomethyl ether, polyethylene glycol monoethyl ether, polyethylene glycol monopropyl ether, polyethylene glycol monoisopropyl ether, polyethylene glycol monobutyl ether and polyethylene glycol monoisobutyl ether; polypropylene glycol mono ethers such as polypropylene glycol monomethyl ether, polypropylene glycol monoethyl ether, polypropylene glycol monopropyl ether, polypropylene glycol monoisopropyl ether, polypropylene glycol monobutyl ether and polypropylene glycol monoisobutyl ether; and the like. The present invention is not limited only to those exemplified ones. These water-soluble organic solvents can be used alone or in combination of two or more kinds thereof, respectively. Among the water-soluble organic solvents, diethylene glycol, triethylene glycol, propylene glycol, diethylene glycol monomethyl ether, diethylene glycol monoethyl ether, diethylene glycol monoisopropyl ether, diethylene glycol monobutyl ether and diethylene glycol monoisobutyl ether are preferable.

Since the amount of the solvent varies depending on the kind and amount of the colorant included in the water-based ink, the amount of the solvent cannot be absolutely determined. Accordingly, it is preferred that the amount of the solvent is appropriately determined in accordance with the kind and amount of the colorant contained in the water-based ink.

The content of the non-volatile component in the water-based ink according to the present invention is preferably 20% by mass or more, and more preferably 25% by mass or more, from the viewpoint of improvement in productivity of the water-based ink. The content of the non-volatile component in the water-based ink according to the present invention is preferably 80% by mass or less, and more preferably 70% by mass or less, from the viewpoint of improvement in handleability of the water-based ink. Therefore, the content of the non-volatile component in the water-based ink according to the present invention is preferably 20 to 80% by mass, and more preferably 25 to 70% by mass. The content of the non-volatile component in the water-based ink according to the present invention is a value as determined in the same manner as the content of the non-volatile component in the resin emulsion.

The water-based ink according to the present invention may contain a resin emulsion other than the above resin emulsion for a water-based ink, a water-soluble resin, a water-dispersible resin and the like within a scope which would not hinder an object of the present invention. In addition, the water-based ink according to the present invention may contain, for example, additives such as a surfactant, a film forming aid, an ultraviolet absorber, an ultraviolet inhibitor, a filler, a leveling agent, a dispersant, a thickener, a wetting agent, a plasticizer, a stabilizer and an antioxidant in an appropriate amount respectively within a scope which would not hinder an object of the present invention.

The water-based ink according to the present invention may contain a resin emulsion other than the above resin emulsion for a water-based ink, such as a urethane resin emulsion, an epoxy resin emulsion or a polyester emulsion, from the viewpoint of improvement in adhesion property to a substrate.

The urethane resin emulsion includes, for example, a polyether-based urethane resin emulsion, a polycarbonate-based urethane resin emulsion, a polyester-based urethane resin emulsion, and the like. The present invention is not limited only to those exemplified ones. The commercially available urethane resin emulsion includes, for example, those manufactured by SANYO KASEI CO., LTD., under the trade names of UCOAT UX-485 (polycarbonate-based polyurethane resin emulsion), UCOAT UWS-145 (polyester-based polyurethane resin emulsion), PERMARIN UA-368T (polycarbonate-based polyurethane resin emulsion), PERMARIN UA-200 (polyether-based polyurethane resin emulsion), UCOAT DA-100 (polyether-based polyurethane resin emulsion), UCOAT DA-200 (polyether-based polyurethane resin emulsion), and the like. The present invention is not limited only to those exemplified ones. The commercially available epoxy resin emulsion includes, for example, those manufactured by ADEKA CORPORATION under the trade names of ADEKA RESIN series, and the like. The present invention is not limited only to those exemplified ones. The commercially available polyester emulsion includes, for example, those manufactured by UNITIKA LTD., under the trade names of ELITEL series, and the like. The present invention is not limited only to those exemplified ones.

In the present invention, a print or an image having a predetermined pattern can be formed, for example, by ejecting the water-based ink onto a substrate in a predetermined pattern with an inkjet recording device. Representative example of the substrate includes a recording medium.

The substrate (recording medium) includes, for example, paper; a paper laminated with a film made of a resin such as polyethylene, polypropylene or polystyrene (coated paper and the like); a plate made of a metal such as aluminum, zinc or copper; a film made of a resin such as cellulose, polyethylene terephthalate, polyethylene, polystyrene, polypropylene, polycarbonate, polyvinyl acetal, polyvinyl chloride or acrylic resin; a paper having a metal coating; a resin film having a metal coating; and the like. The present invention is not limited only to those exemplified ones. Among the substrates (recording media), a non-liquid absorbing film is preferable. The non-liquid absorbing film includes, for example, a coated paper, a polyester film such as polyethylene terephthalate (PET) film, a polyvinyl chloride film, a polypropylene film such as a biaxially orientated polypropylene (OPP) film, a polyethylene film, a nylon film, and the like. Among the non-liquid absorbing films, the polyethylene terephthalate (PET) film and the biaxially orientated polypropylene (OPP) film are preferable.

In addition, a desired design can be imparted to a textile such as a cloth made of a natural fiber such as cotton, or a synthetic fiber such as a polyester fiber, an acrylic fiber or a polyamide fiber, for example, by printing the water-based ink on the textile with an inkjet recording device and the like in the present invention.

The water-based ink according to the present invention obtained as mentioned above is comprehensively excellent in scratch resistance, adhesion property to a substrate and blocking resistance. Therefore, the water-based ink according to the present invention can be suitably used as, for example, a water-based ink for inkjet printing, an ink for flexo printing, an ink for offset printing, an ink for lithograph printing, an ink for gravure printing, an ink for screen printing, and the like. Among them, the water-based ink according to the present invention can be suitably used as the water-based ink for inkjet printing.

EXAMPLES

Next, the present invention is more specifically described based on working examples. However, the present invention is not limited only to the working examples.

Preparation Example 1

A separable flask made of a stainless steel, equipped with a reflux cooler, a stirrer and a thermometer, and having a volume of 2.5 L (liter) was charged with 112 g of pure water (initial charging), and the temperature of the pure water was raised to its boiling point under stirring.

Next, when the temperature of the pure water in the flask attained to its boiling point, an operation for continuously adding dropwise 474 g of 80% aqueous solution of acrylic acid to the flask at a constant dropping rate over 180 minutes under a condition of refluxing at the boiling point with stirring, an operation for continuously adding dropwise 26 g of 15% aqueous solution of sodium persulfate to the flask at a constant dropping rate over 195 minutes, an operation for continuously adding dropwise 5.8 g of 45% aqueous solution of sodium hypophosphite to the flask at a constant dropping rate over 18 minutes, and an operation for continuously adding dropwise 28 g of a sodium hypophosphite aqueous solution to the flask at a constant dropping rate over 192 minutes were carried out with a tip nozzle through each supplying path of each operation respectively. In addition, when 92 minutes passed from the initiation of the polymerization, 97 g of pure water was continuously added dropwise to the flask over 88 minutes at a constant dropping rate from a tip nozzle with another supply path.

When the dropping of the aqueous solution of acrylic acid was completed, contents in the flask were held (aged) for 30 minutes with refluxing at a boiling point thereof, to complete the reaction of the contents in the flask. After the completion of the reaction, 62 g of 45% aqueous solution of sodium hypophosphite and 23 g of pure water were added to the flask, and 119 g of 25% aqueous ammonia was gradually added dropwise to the flask while the contents in the flask were allowed to cool under stirring, to neutralize the contents in the flask, and thereby an aqueous solution of an acrylic acid polymer ammonium salt was obtained.

The content of nonvolatile component (acrylic acid polymer ammonium salt) in the aqueous solution of the acrylic acid polymer ammonium salt obtained in the above was 45% by mass, and the weight average molecular weight of the acrylic acid polymer ammonium salt was 10500.

Incidentally, the weight average molecular weight of the carboxylic acid polymer non-metal salt is a weight average molecular weight as determined from a calibration curve of standard sodium polyacrylate with a gel permeation chromatography.

Preparation Example 2

A separable flask made of a stainless steel, equipped with a reflux cooler, a stirrer and a thermometer, and having a volume of 2.5 L (liter) was charged with 94 g of pure water (initial charging), and the temperature of the pure water was raised to its boiling point under stirring.

Next, when the pure water in the flask attained to its boiling point, an operation for continuously adding dropwise 474 g of 80% aqueous solution of acrylic acid to the flask at a constant dropping rate over 180 minutes under a condition of refluxing at the boiling point with stirring, an operation for continuously adding dropwise 26 g of 15% aqueous solution of sodium persulfate to the flask at a constant dropping rate over 195 minutes, an operation for continuously adding dropwise 5.8 g of 45% aqueous solution of sodium hypophosphite to the flask at a constant dropping rate over 18 minutes, and an operation for continuously adding dropwise 28 g of a sodium hypophosphite aqueous solution to the flask at a constant dropping rate over 192 minutes were carried out with a tip nozzle through each supplying path of each operation respectively. In addition, when 92 minutes passed from the initiation of the polymerization, 60 g of pure water was continuously added dropwise to the flask over 88 minutes at a constant dropping rate from a tip nozzle with another supply path.

When the dropping of the aqueous solution of acrylic acid was completed, contents in the flask were held (aged) for 30 minutes with refluxing at a boiling point thereof, to complete the reaction of the contents in the flask. After the completion of the reaction, 62 g of 45% aqueous solution of sodium hypophosphite and 20 g of pure water were added to the flask, and 177 g of triethylamine was gradually added dropwise to the flask while the contents in the flask were allowed to cool under stirring, to neutralize the contents in the flask, and thereby an aqueous solution of an acrylic acid polymer triethylamine salt was obtained.

The content of nonvolatile component (acrylic acid polymer triethylamine salt) in the aqueous solution of the acrylic acid polymer triethylamine salt obtained in the above was 45% by mass, and the weight average molecular weight of the acrylic acid polymer triethylamine salt was 10500.

Comparative Preparation Example 1

A separable flask made of a stainless, steel equipped with a reflux cooler, a stirrer and a thermometer, and having a volume of 2.5 L (liter) was charged with 115 g of pure water (initial charging), and the temperature of the pure water was raised to its boiling point under stirring.

Next, when the pure water in the flask attained to its boiling point, an operation for continuously adding dropwise 474 g of 80% aqueous solution of acrylic acid to the flask at a constant dropping rate over 180 minutes under a condition of refluxing at the boiling point with stirring, an operation for continuously adding dropwise 26 g of 15% aqueous solution of sodium persulfate to the flask at a constant dropping rate over 195 minutes, an operation for continuously adding dropwise 5.8 g of 45% aqueous solution of sodium hypophosphite to the flask at a constant dropping rate over 18 minutes, and an operation for continuously adding dropwise 28 g of a sodium hypophosphite aqueous solution to the flask at a constant dropping rate over 192 minutes were carried out with a tip nozzle through each supplying path of each operation respectively. In addition, when 92 minutes passed from the initiation of the polymerization, 70 g of pure water was continuously added dropwise to the flask over 88 minutes at a constant dropping rate from a tip nozzle with another supply path.

When the dropping of the aqueous solution of acrylic acid was completed, contents in the flask were held (aged) for 30 minutes with refluxing at a boiling point thereof, to complete the reaction of the contents in the flask. After the completion of the reaction, 62 g of 45% aqueous solution of sodium hypophosphite and 20 g of pure water were added to the flask, and 146 g of 48% aqueous solution of sodium hydroxide was gradually added dropwise to the flask while the contents in the flask were allowed to cool under stirring, to neutralize the contents in the flask, and thereby an aqueous solution of an acrylic acid polymer sodium salt was obtained.

The content of nonvolatile component (aqueous solution of acrylic acid polymer sodium salt) in the aqueous solution of the acrylic acid polymer sodium salt obtained in the above was 45% by mass, and the weight average molecular weight of the acrylic acid polymer sodium salt was 10500.

Example 1

A flask equipped with a dropping funnel, a stirrer, a nitrogen gas introduction tube, a thermometer and a reflux condenser was charged with 767 g of deionized water. A dropping funnel was charged with 169 g of deionized water, 70 g of 25% aqueous solution of an emulsifier [manufactured by ADEKA CORPORATION under the trade name: ADEKA REASOAP SR-10], 17 g of 2-ethylhexyl acrylate and 483 g of styrene, to prepare a pre-emulsion for first-stage dropping. A part of the pre-emulsion for first-stage dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for first-stage dropping and 20 g of 5% aqueous solution of ammonium persulfate were uniformly added dropwise to the flask over 120 minutes.

After the completion of adding dropwise, the contents in the flask were maintained at 80° C. for 60 minutes, and a pre-emulsion for second-stage dropping composed of 169 g of deionized water, 70 g of 25% aqueous solution of an emulsifier [manufactured by ADEKA CORPORATION under the trade name: ADEKA REASOAP SR-10], 235 g of 2-ethylhexyl acrylate, 235 g of methyl methacrylate, 20 g of 2-hydroxyethyl methacrylate and 10 g of 4-methacryloyloxy-2,2,6,6-tetramethylpiperidine [manufactured by ADEKA CORPORATION under the trade name: ADK STAB LA-87] as a nitrogen atom-containing monomer, and 10 g of 5% aqueous solution of ammonium persulfate were continuously added dropwise to the flask over 60 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh (JIS mesh, hereinafter referred to the same), to give a resin emulsion for a water-based ink.

Incidentally, in each of Examples and Comparative examples, the pH is a value as determined at 25° C. with a pH meter [manufactured by HORIBA, Ltd. under the product number: F-23].

The content of the non-volatile component in the resin emulsion for a water-based ink obtained in the above was 45% by mass. The emulsion particles contained in the resin emulsion for a water-based ink had a resin layer of a two-layer structure. The average particle diameter of the emulsion particles was 240 nm. The average molecular weight of the polymer constituting the emulsion particles was 620000. The glass transition temperature of the inner layer of the emulsion particles was 90° C., and the glass transition temperature of the outer layer was −5° C. The glass transition temperature of the emulsion particles themselves was 35° C.

Example 2

A flask equipped with a dropping funnel, a stirrer, a nitrogen gas introduction tube, a thermometer and a reflux condenser was charged with 767 g of deionized water. A dropping funnel was charged with 169 g of deionized water, 70 g of 25% aqueous solution of an emulsifier [manufactured by ADEKA CORPORATION under the trade name: ADEKA REASOAP SR-10], 17 g of 2-ethylhexyl acrylate and 483 g of styrene, to prepare a pre-emulsion for first-stage dropping. A part of the pre-emulsion for first-stage dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for first-stage dropping and 20 g of 5% aqueous solution of ammonium persulfate were uniformly added dropwise to the flask over 120 minutes.

After the completion of adding dropwise, the contents in the flask were maintained at 80° C. for 60 minutes, and a pre-emulsion for second-stage dropping composed of 169 g of deionized water, 70 g of 25% aqueous solution of an emulsifier [manufactured by ADEKA CORPORATION under the trade name: ADEKA REASOAP SR-10], 237 g of 2-ethylhexyl acrylate, 213 g of methyl methacrylate, 20 g of 2-hydroxyethyl methacrylate and 30 g of 4-methacryloyloxy-2,2,6,6-tetramethylpiperidine [manufactured by ADEKA CORPORATION under the trade name: ADK STAB LA-87] as a nitrogen atom-containing monomer, and 10 g of 5% aqueous solution of ammonium persulfate were continuously added dropwise to the flask over 60 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The emulsion particles contained in the resin emulsion for a water-based ink had a resin layer of a two-layer structure. The average particle diameter of the emulsion particles was 240 nm. The average molecular weight of the polymer constituting the emulsion particles was 620000. The glass transition temperature of the inner layer of the emulsion particles was 90° C., and the glass transition temperature of the outer layer was −5° C. The glass transition temperature of the emulsion particles themselves was 35° C.

Example 3

A flask equipped with a dropping funnel, a stirrer, a nitrogen gas introduction tube, a thermometer and a reflux condenser was charged with 767 g of deionized water. A dropping funnel was charged with 169 g of deionized water, 70 g of 25% aqueous solution of an emulsifier [manufactured by ADEKA CORPORATION under the trade name: ADEKA REASOAP SR-10], 17 g of 2-ethylhexyl acrylate and 483 g of styrene, to prepare a pre-emulsion for first-stage dropping. A part of the pre-emulsion for first-stage dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for first-stage dropping and 20 g of 5% aqueous solution of ammonium persulfate were uniformly added dropwise to the flask over 120 minutes.

After the completion of adding dropwise, the contents in the flask were maintained at 80° C. for 60 minutes, and a pre-emulsion for second-stage dropping composed of 169 g of deionized water, 70 g of 25% aqueous solution of an emulsifier [manufactured by ADEKA CORPORATION under the trade name: ADEKA REASOAP SR-10], 238 g of 2-ethylhexyl acrylate, 192 g of methyl methacrylate, 20 g of 2-hydroxyethyl methacrylate and 50 g of 4-methacryloyloxy-2,2,6,6-tetramethylpiperidine [manufactured by ADEKA CORPORATION under the trade name: ADK STAB LA-87] as a nitrogen atom-containing monomer, and 10 g of 5% aqueous solution of ammonium persulfate were continuously added dropwise to the flask over 60 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The emulsion particles contained in the resin emulsion for a water-based ink had a resin layer of a two-layer structure. The average particle diameter of the emulsion particles was 240 nm. The average molecular weight of the polymer constituting the emulsion particles was 620000. The glass transition temperature of the inner layer of the emulsion particles was 90° C., and the glass transition temperature of the outer layer was −5° C. The glass transition temperature of the emulsion particles themselves was 35° C.

Example 4

A flask equipped with a dropping funnel, a stirrer, a nitrogen gas introduction tube, a thermometer and a reflux condenser was charged with 766 g of deionized water. A dropping funnel was charged with 339 g of deionized water, 140 g of 25% aqueous solution of an emulsifier [manufactured by ADEKA CORPORATION under the trade name: ADEKA REASOAP SR-10], 254 g of 2-ethylhexyl acrylate, 358 g of methyl methacrylate, 358 g of styrene, 20 g of 2-hydroxyethyl methacrylate and 10 g of 4-methacryloyloxy-2,2,6,6-tetramethylpiperidine [manufactured by ADEKA CORPORATION under the trade name: ADK STAB LA-87] as a nitrogen atom-containing monomer, to prepare a pre-emulsion for dropping. A part of the pre-emulsion for dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for dropping and 30 g of 5% aqueous solution of ammonium persulfate were uniformly added dropwise to the flask over 120 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The average particle diameter of the emulsion particles was 220 nm. The average molecular weight of the polymer constituting the emulsion particles was 430000. The glass transition temperature of the emulsion particles was 35° C.

Example 5

A flask equipped with a dropping funnel, a stirrer, a nitrogen gas introduction tube, a thermometer and a reflux condenser was charged with 766 g of deionized water. A dropping funnel was charged with 339 g of deionized water, 140 g of 25% aqueous solution of an emulsifier [manufactured by ADEKA CORPORATION under the trade name: ADEKA REASOAP SR-10], 254 g of 2-ethylhexyl acrylate, 358 g of methyl methacrylate, 358 g of styrene, 20 g of 2-hydroxyethyl methacrylate and 10 g of 4-methacryloyloxy-2,2,6,6-tetramethylpiperidine [manufactured by ADEKA CORPORATION under the trade name: ADK STAB LA-87] as a nitrogen atom-containing monomer, to prepare a pre-emulsion for dropping. A part of the pre-emulsion for dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for dropping and 30 g of 5% aqueous solution of ammonium persulfate were uniformly added dropwise to the flask over 120 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 2 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The average particle diameter of the emulsion particles was 220 nm. The average molecular weight of the polymer constituting the emulsion particles was 430000. The glass transition temperature of the emulsion particles was 35° C.

Example 6

A flask equipped with a dropping funnel, a stirrer, a nitrogen gas introduction tube, a thermometer and a reflux condenser was charged with 766 g of deionized water. A dropping funnel was charged with 339 g of deionized water, 140 g of 25% aqueous solution of an emulsifier [manufactured by ADEKA CORPORATION under the trade name: ADEKA REASOAP SR-10], 250 g of 2-ethylhexyl acrylate, 360 g of methyl methacrylate, 360 g of styrene, 20 g of 2-hydroxyethyl methacrylate and 10 g of dimethylaminoethyl methacrylate as a nitrogen atom-containing monomer, to prepare a pre-emulsion for dropping. A part of the pre-emulsion for dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for dropping and 30 g of 5% aqueous solution of ammonium persulfate were uniformly added dropwise to the flask over 120 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The average particle diameter of the emulsion particles was 220 nm. The average molecular weight of the polymer constituting the emulsion particles was 430000. The glass transition temperature of the emulsion particles was 35° C.

Example 7

A flask equipped with a dropping funnel, a stirrer, a nitrogen gas introduction tube, a thermometer and a reflux condenser was charged with 767 g of deionized water. A dropping funnel was charged with 689 g of deionized water, 28 g of 25% aqueous solution of an emulsifier [manufactured by ADEKA CORPORATION under the trade name: ADEKA REASOAP SR-10], 7 g of 2-ethylhexyl acrylate and 193 g of styrene, to prepare a pre-emulsion for first-stage dropping. A part of the pre-emulsion for first-stage dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for first-stage dropping and 20 g of 5% aqueous solution of ammonium persulfate were uniformly added dropwise to the flask over 120 minutes.

After the completion of adding dropwise, the contents in the flask were maintained at 80° C. for 60 minutes, and a pre-emulsion for second-stage dropping composed of 271 g of deionized water, 112 g of 25% aqueous solution of an emulsifier [manufactured by ADEKA CORPORATION under the trade name: ADEKA REASOAP SR-10], 550 g of 2-ethylhexyl acrylate, 200 g of methyl methacrylate, 20 g of 2-hydroxyethyl methacrylate and 30 g of 4-methacryloyloxy-2,2,6,6-tetramethylpiperidine [manufactured by ADEKA CORPORATION under the trade name: ADK STAB LA-87] as a nitrogen atom-containing monomer, and 10 g of 5% aqueous solution of ammonium persulfate were continuously added dropwise to the flask over 60 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The emulsion particles contained in the resin emulsion for a water-based ink had a resin layer of a two-layer structure. The average particle diameter of the emulsion particles was 240 nm. The average molecular weight of the polymer constituting the emulsion particles was 580000. The glass transition temperature of the inner layer of the emulsion particles was 89° C., and the glass transition temperature of the outer layer was −36° C. The glass transition temperature of the emulsion particles themselves was −18° C.

Example 8

A flask equipped with a dropping funnel, a stirrer, a nitrogen gas introduction tube, a thermometer and a reflux condenser was charged with 767 g of deionized water. A dropping funnel was charged with 68 g of deionized water, 28 g of 25% aqueous solution of an emulsifier [manufactured by ADEKA CORPORATION under the trade name: ADEKA REASOAP SR-10], 7 g of 2-ethylhexyl acrylate and 193 g of styrene, to prepare a pre-emulsion for first-stage dropping. A part of the pre-emulsion for first-stage dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for first-stage dropping and 20 g of 5% aqueous solution of ammonium persulfate were uniformly added dropwise to the flask over 120 minutes.

After the completion of adding dropwise, the contents in the flask were maintained at 80° C. for 60 minutes, and a pre-emulsion for second-stage dropping composed of 271 g of deionized water, 112 g of 25% aqueous solution of an emulsifier [manufactured by ADEKA CORPORATION under the trade name: ADEKA REASOAP SR-10], 450 g of 2-ethylhexyl acrylate, 300 g of methyl methacrylate, 20 g of 2-hydroxyethyl methacrylate and 30 g of 4-methacryloyloxy-2,2,6,6-tetramethylpiperidine [manufactured by ADEKA CORPORATION under the trade name: ADK STAB LA-87] as a nitrogen atom-containing monomer, and 10 g of 5% aqueous solution of ammonium persulfate were continuously added dropwise to the flask over 60 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The emulsion particles contained in the resin emulsion for a water-based ink had a resin layer of a two-layer structure. The average particle diameter of the emulsion particles was 240 nm. The average molecular weight of the polymer constituting the emulsion particles was 565000. The glass transition temperature of the inner layer of the emulsion particles was 89° C., and the glass transition temperature of the outer layer was −19° C. The glass transition temperature of the emulsion particles themselves was −3° C.

Example 9

A flask equipped with a dropping funnel, a stirrer, a nitrogen gas introduction tube, a thermometer and a reflux condenser was charged with 767 g of deionized water. A dropping funnel was charged with 169 g of deionized water, 70 g of 25% aqueous solution of an emulsifier [manufactured by ADEKA CORPORATION under the trade name: ADEKA REASOAP SR-10], 17 g of 2-ethylhexyl acrylate and 483 g of styrene, to prepare a pre-emulsion for first-stage dropping. A part of the pre-emulsion for first-stage dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for first-stage dropping and 20 g of 5% aqueous solution of ammonium persulfate were uniformly added dropwise to the flask over 120 minutes.

After the completion of adding dropwise, the contents in the flask were maintained at 80° C. for 60 minutes, and a pre-emulsion for second-stage dropping composed of 169 g of deionized water, 70 g of 25% aqueous solution of an emulsifier [manufactured by ADEKA CORPORATION under the trade name: ADEKA REASOAP SR-10], 240 g of 2-ethylhexyl acrylate, 160 g of methyl methacrylate, 20 g of 2-hydroxyethyl methacrylate and 80 g of 4-methacryloyloxy-2,2,6,6-tetramethylpiperidine [manufactured by ADEKA CORPORATION under the trade name: ADK STAB LA-87] as a nitrogen atom-containing monomer, and 10 g of 5% aqueous solution of ammonium persulfate were continuously added dropwise to the flask over 60 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The emulsion particles contained in the resin emulsion for a water-based ink had a resin layer of a two-layer structure. The average particle diameter of the emulsion particles was 210 nm. The average molecular weight of the polymer constituting the emulsion particles was 620000. The glass transition temperature of the inner layer of the emulsion particles was 90° C., and the glass transition temperature of the outer layer was −5° C. The glass transition temperature of the emulsion particles themselves was 35° C.

Example 10

A flask equipped with a dropping funnel, a stirrer, a nitrogen gas introduction tube, a thermometer and a reflux condenser was charged with 767 g of deionized water. A dropping funnel was charged with 169 g of deionized water, 70 g of 25% aqueous solution of an emulsifier [manufactured by ADEKA CORPORATION under the trade name: ADEKA REASOAP SR-10], 17 g of 2-ethylhexyl acrylate and 483 g of styrene, to prepare a pre-emulsion for first-stage dropping. A part of the pre-emulsion for first-stage dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for first-stage dropping and 20 g of 5% aqueous solution of ammonium persulfate were uniformly added dropwise to the flask over 120 minutes.

After the completion of adding dropwise, the contents in the flask were maintained at 80° C. for 60 minutes, and a pre-emulsion for second-stage dropping composed of 169 g of deionized water, 70 g of 25% aqueous solution of an emulsifier [manufactured by ADEKA CORPORATION under the trade name: ADEKA REASOAP SR-10], 235 g of 2-ethylhexyl acrylate, 235 g of methyl methacrylate, 20 g of 2-hydroxyethyl methacrylate and 10 g of 4-methacryloyloxy-2,2,6,6-tetramethylpiperidine [manufactured by ADEKA CORPORATION under the trade name: ADK STAB LA-87] as a nitrogen atom-containing monomer, and 10 g of 5% aqueous solution of ammonium persulfate were continuously added dropwise to the flask over 60 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 115 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The emulsion particles contained in the resin emulsion for a water-based ink had a resin layer of a two-layer structure. The average particle diameter of the emulsion particles was 210 nm. The average molecular weight of the polymer constituting the emulsion particles was 530000. The glass transition temperature of the inner layer of the emulsion particles was 90° C., and the glass transition temperature of the outer layer was −5° C. The glass transition temperature of the emulsion particles themselves was 35° C.

Example 11

A flask equipped with a dropping funnel, a stirrer, a nitrogen gas introduction tube, a thermometer and a reflux condenser was charged with 767 g of deionized water. A dropping funnel was charged with 169 g of deionized water, 70 g of 25% aqueous solution of an emulsifier [manufactured by ADEKA CORPORATION under the trade name: ADEKA REASOAP SR-10], 17 g of 2-ethylhexyl acrylate and 483 g of styrene, to prepare a pre-emulsion for first-stage dropping. A part of the pre-emulsion for first-stage dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for first-stage dropping and 20 g of 5% aqueous solution of ammonium persulfate were uniformly added dropwise to the flask over 120 minutes.

After the completion of adding dropwise, the contents in the flask were maintained at 80° C. for 60 minutes, and a pre-emulsion for second-stage dropping composed of 169 g of deionized water, 70 g of 25% aqueous solution of an emulsifier [manufactured by ADEKA CORPORATION under the trade name: ADEKA REASOAP SR-10], 235 g of 2-ethylhexyl acrylate, 235 g of methyl methacrylate, 20 g of 2-hydroxyethyl methacrylate and 10 g of 4-methacryloyloxy-2,2,6,6-tetramethylpiperidine [manufactured by ADEKA CORPORATION under the trade name: ADK STAB LA-87] as a nitrogen atom-containing monomer, and 10 g of 5% aqueous solution of ammonium persulfate were continuously added dropwise to the flask over 60 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 230 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The emulsion particles contained in the resin emulsion for a water-based ink had a resin layer of a two-layer structure. The average particle diameter of the emulsion particles was 210 nm. The average molecular weight of the polymer constituting the emulsion particles was 500000. The glass transition temperature of the inner layer of the emulsion particles was 90° C., and the glass transition temperature of the outer layer was −5° C. The glass transition temperature of the emulsion particles themselves was 35° C.

Example 12

A flask equipped with a dropping funnel, a stirrer, a nitrogen gas introduction tube, a thermometer and a reflux condenser was charged with 766 g of deionized water. A dropping funnel was charged with 339 g of deionized water, 140 g of 25% aqueous solution of an emulsifier [manufactured by ADEKA CORPORATION under the trade name: ADEKA REASOAP SR-10], 254 g of 2-ethylhexyl acrylate, 358 g of methyl methacrylate, 358 g of styrene, 20 g of 2-hydroxyethyl methacrylate and 10 g of 4-methacryloyloxy-2,2,6,6-tetramethylpiperidine [manufactured by ADEKA CORPORATION under the trade name: ADK STAB LA-87] as a nitrogen atom-containing monomer, to prepare a pre-emulsion for dropping. A part of the pre-emulsion for dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for dropping and 30 g of 5% aqueous solution of ammonium persulfate were uniformly added dropwise to the flask over 120 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The average particle diameter of the emulsion particles was 220 nm. The average molecular weight of the polymer constituting the emulsion particles was 430000. The glass transition temperature of the emulsion particles was 35° C.

Example 13

A flask equipped with a dropping funnel, a stirrer, a nitrogen gas introduction tube, a thermometer and a reflux condenser was charged with 767 g of deionized water. A dropping funnel was charged with 169 g of deionized water, 70 g of 25% aqueous solution of an emulsifier [manufactured by ADEKA CORPORATION under the trade name: ADEKA REASOAP SR-10], 17 g of 2-ethylhexyl acrylate and 483 g of styrene, to prepare a pre-emulsion for first-stage dropping. A part of the pre-emulsion for first-stage dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for first-stage dropping and 20 g of 5% aqueous solution of ammonium persulfate were uniformly added dropwise to the flask over 120 minutes.

After the completion of adding dropwise, the contents in the flask were maintained at 80° C. for 60 minutes, and a pre-emulsion for second-stage dropping composed of 169 g of deionized water, 70 g of 25% aqueous solution of an emulsifier [manufactured by ADEKA CORPORATION under the trade name: ADEKA REASOAP SR-10], 217 g of 2-ethylhexyl acrylate, 253 g of cyclohexyl methacrylate, 20 g of 2-hydroxyethyl methacrylate and 10 g of 4-methacryloyloxy-2,2,6,6-tetramethylpiperidine [manufactured by ADEKA CORPORATION under the trade name: ADK STAB LA-87] as a nitrogen atom-containing monomer, and 10 g of 5% aqueous solution of ammonium persulfate were continuously added dropwise to the flask over 60 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The emulsion particles contained in the resin emulsion for a water-based ink had a resin layer of a two-layer structure. The average particle diameter of the emulsion particles was 240 nm. The average molecular weight of the polymer constituting the emulsion particles was 620000. The glass transition temperature of the inner layer of the emulsion particles was 90° C., and the glass transition temperature of the outer layer was −5° C. The glass transition temperature of the emulsion particles themselves was 35° C.

Example 14

A flask equipped with a dropping funnel, a stirrer, a nitrogen gas introduction tube, a thermometer and a reflux condenser was charged with 767 g of deionized water. A dropping funnel was charged with 169 g of deionized water, 70 g of 25% aqueous solution of an emulsifier [manufactured by ADEKA CORPORATION under the trade name: ADEKA REASOAP SR-10], 15 g of 2-ethylhexyl acrylate, 370 g of methyl methacrylate and 115 g of cyclohexyl methacrylate, to prepare a pre-emulsion for first-stage dropping. A part of the pre-emulsion for first-stage dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for first-stage dropping and 20 g of 5% aqueous solution of ammonium persulfate were uniformly added dropwise to the flask over 120 minutes.

After the completion of adding dropwise, the contents in the flask were maintained at 80° C. for 60 minutes, and a pre-emulsion for second-stage dropping composed of 169 g of deionized water, 70 g of 25% aqueous solution of an emulsifier [manufactured by ADEKA CORPORATION under the trade name: ADEKA REASOAP SR-10], 217 g of 2-ethylhexyl acrylate, 253 g of cyclohexyl methacrylate, 20 g of 2-hydroxyethyl methacrylate and 10 g of 4-methacryloyloxy-2,2,6,6-tetramethylpiperidine [manufactured by ADEKA CORPORATION under the trade name: ADK STAB LA-87] as a nitrogen atom-containing monomer, and 10 g of 5% aqueous solution of ammonium persulfate were continuously added dropwise to the flask over 60 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The emulsion particles contained in the resin emulsion for a water-based ink had a resin layer of a two-layer structure. The average particle diameter of the emulsion particles was 240 nm. The average molecular weight of the polymer constituting the emulsion particles was 620000. The glass transition temperature of the inner layer of the emulsion particles was 90° C., and the glass transition temperature of the outer layer was −5° C. The glass transition temperature of the emulsion particles themselves was 35° C.

Example 15

A flask equipped with a dropping funnel, a stirrer, a nitrogen gas introduction tube, a thermometer and a reflux condenser was charged with 767 g of deionized water. A dropping funnel was charged with 169 g of deionized water, 70 g of 25% aqueous solution of an emulsifier [manufactured by ADEKA CORPORATION under the trade name: ADEKA REASOAP SR-10], 17 g of 2-ethylhexyl acrylate and 483 g of styrene, to prepare a pre-emulsion for first-stage dropping. A part of the pre-emulsion for first-stage dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for first-stage dropping and 20 g of 5% aqueous solution of ammonium persulfate were uniformly added dropwise to the flask over 120 minutes.

After the completion of adding dropwise, the contents in the flask were maintained at 80° C. for 60 minutes, and a pre-emulsion for second-stage dropping composed of 169 g of deionized water, 70 g of 25% aqueous solution of an emulsifier [manufactured by ADEKA CORPORATION under the trade name: ADEKA REASOAP SR-10], 224 g of 2-ethylhexyl acrylate, 186 g of methyl methacrylate, 80 g of 2-hydroxyethyl methacrylate and 10 g of 4-methacryloyloxy-2,2,6,6-tetramethylpiperidine [manufactured by ADEKA CORPORATION under the trade name: ADK STAB LA-87] as a nitrogen atom-containing monomer, and 10 g of 5% aqueous solution of ammonium persulfate were continuously added dropwise to the flask over 60 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The emulsion particles contained in the resin emulsion for a water-based ink had a resin layer of a two-layer structure. The average particle diameter of the emulsion particles was 240 nm. The average molecular weight of the polymer constituting the emulsion particles was 620000. The glass transition temperature of the inner layer of the emulsion particles was 90° C., and the glass transition temperature of the outer layer was −5° C. The glass transition temperature of the emulsion particles themselves was 35° C.

Example 16

A flask equipped with a dropping funnel, a stirrer, a nitrogen gas introduction tube, a thermometer and a reflux condenser was charged with 767 g of deionized water. A dropping funnel was charged with 169 g of deionized water, 70 g of 25% aqueous solution of an emulsifier [manufactured by ADEKA CORPORATION under the trade name: ADEKA REASOAP SR-10], 17 g of 2-ethylhexyl acrylate and 483 g of styrene, to prepare a pre-emulsion for first-stage dropping. A part of the pre-emulsion for first-stage dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for first-stage dropping and 20 g of 5% aqueous solution of ammonium persulfate were uniformly added dropwise to the flask over 120 minutes.

After the completion of adding dropwise, the contents in the flask were maintained at 80° C. for 60 minutes, and a pre-emulsion for second-stage dropping composed of 169 g of deionized water, 70 g of 25% aqueous solution of an emulsifier [manufactured by ADEKA CORPORATION under the trade name: ADEKA REASOAP SR-10], 203 g of 2-ethylhexyl acrylate, 87 g of methyl methacrylate, 200 g of 2-hydroxyethyl methacrylate and 10 g of 4-methacryloyloxy-2,2,6,6-tetramethylpiperidine [manufactured by ADEKA CORPORATION under the trade name: ADK STAB LA-87] as a nitrogen atom-containing monomer, and 10 g of 5% aqueous solution of ammonium persulfate were continuously added dropwise to the flask over 60 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The emulsion particles contained in the resin emulsion for a water-based ink had a resin layer of a two-layer structure. The average particle diameter of the emulsion particles was 240 nm. The average molecular weight of the polymer constituting the emulsion particles was 620000. The glass transition temperature of the inner layer of the emulsion particles was 90° C., and the glass transition temperature of the outer layer was −5° C. The glass transition temperature of the emulsion particles themselves was 35° C.

Example 17

A urethane resin emulsion [manufactured by SANYO KASEI CO., LTD. under the trade name: PERMARIN UA-200] in an amount of 833 g was added to the resin emulsion for a water-based ink obtained in Example 1 under stirring, and the resulting mixture was filtered through a wire mesh having an opening of 300 mesh, to give a resin emulsion for a water-based ink A.

The content of the non-volatile component in resin emulsion for a water-based ink A obtained in the above was 40% by mass. The average particle diameter of the emulsion particles was 150 nm. The weight average molecular weight of the polymer constituting the emulsion particles was 500000.

Example 18

An epoxy resin emulsion [manufactured by ADEKA CORPORATION under the trade name: ADEKA RESIN EM-0427WC] in an amount of 500 g was added to the resin emulsion for a water-based ink obtained in Example 1 under stirring, and the resulting mixture was filtered through a wire mesh having an opening of 300 mesh, to give a resin emulsion for a water-based ink B.

The content of the non-volatile component in resin emulsion for a water-based ink B obtained in the above was 46% by mass. The average particle diameter of the emulsion particles was 270 nm. The weight average molecular weight of the polymer constituting the emulsion particles was 500000.

Example 19

A polyester emulsion [manufactured by UNITIKA LTD. under the trade name: ELITEL KT-9204] in an amount of 833 g was added to the resin emulsion for a water-based ink obtained in Example 1 under stirring, and the resulting mixture was filtered through a wire mesh having an opening of 300 mesh, to give a resin emulsion for a water-based ink C.

The content of the non-volatile component in resin emulsion for a water-based ink C obtained in the above was 40% by mass. The average particle diameter of the emulsion particles was 200 nm. The weight average molecular weight of the polymer constituting the emulsion particles was 500000.

Comparative Example 1

A flask equipped with a dropping funnel, a stirrer, a nitrogen gas introduction tube, a thermometer and a reflux condenser was charged with 766 g of deionized water. A dropping funnel was charged with 339 g of deionized water, 140 g of 25% aqueous solution of an emulsifier [manufactured by ADEKA CORPORATION under the trade name: ADEKA REASOAP SR-10], 254 g of 2-ethylhexyl acrylate, 363 g of methyl methacrylate, 363 g of styrene and 20 g of 2-hydroxyethyl methacrylate, to prepare a pre-emulsion for dropping. A part of the pre-emulsion for dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for dropping and 30 g of 5% aqueous solution of ammonium persulfate were uniformly added dropwise to the flask over 120 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The average particle diameter of the emulsion particles was 200 nm. The average molecular weight of the polymer constituting the emulsion particles was 380000. The glass transition temperature of the emulsion particles was 35° C.

Comparative Example 2

A flask equipped with a dropping funnel, a stirrer, a nitrogen gas introduction tube, a thermometer and a reflux condenser was charged with 766 g of deionized water. A dropping funnel was charged with 339 g of deionized water, 140 g of 25% aqueous solution of an emulsifier [manufactured by ADEKA CORPORATION under the trade name: ADEKA REASOAP SR-10], 254 g of 2-ethylhexyl acrylate, 358 g of methyl methacrylate, 358 g of styrene, 20 g of 2-hydroxyethyl methacrylate and 10 g of 4-methacryloyloxy-2,2,6,6-tetramethylpiperidine [manufactured by ADEKA CORPORATION under the trade name: ADK STAB LA-87] as a nitrogen atom-containing monomer, to prepare a pre-emulsion for dropping. A part of the pre-emulsion for dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for dropping and 30 g of 5% aqueous solution of ammonium persulfate were uniformly added dropwise to the flask over 120 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Comparative preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The average particle diameter of the emulsion particles was 200 nm. The average molecular weight of the polymer constituting the emulsion particles was 380000. The glass transition temperature of the emulsion particles was 35° C.

Comparative Example 3

A flask equipped with a dropping funnel, a stirrer, a nitrogen gas introduction tube, a thermometer and a reflux condenser was charged with 766 g of deionized water. A dropping funnel was charged with 339 g of deionized water, 140 g of 25% aqueous solution of an emulsifier [manufactured by ADEKA CORPORATION under the trade name: ADEKA REASOAP SR-10], 258 g of 2-ethylhexyl acrylate, 336 g of methyl methacrylate, 336 g of styrene, 20 g of 2-hydroxyethyl methacrylate and 50 g of 4-methacryloyloxy-2,2,6,6-tetramethylpiperidine [manufactured by ADEKA CORPORATION under the trade name: ADK STAB LA-87] as a nitrogen atom-containing monomer, to prepare a pre-emulsion for dropping. A part of the pre-emulsion for dropping in an amount of 30 g corresponding to 2% by mass of the total amount of the monomer component was added to the flask, and a temperature of the contents was raised to 80° C. while nitrogen gas was gently blowing. Thereafter, 30 g of 5% aqueous solution of ammonium persulfate was added to the flask, to initiate a polymerization. Thereafter, the remaining pre-emulsion for dropping and 30 g of 5% aqueous solution of ammonium persulfate were uniformly added dropwise to the flask over 120 minutes.

After the completion of adding dropwise, the contents in the flask were maintained at 80° C. for 60 minutes, and 25% aqueous ammonia was added to the flask so that the pH of the contents was 9, to complete a polymerization reaction. The resulting reaction solution was cooled to room temperature. Thereafter, 23 g of the carboxylic acid polymer ammonium salt obtained in Comparative preparation example 1 was added to the flask under stirring, and the resulting mixture was filtered through a wire mesh having an opening of 300 mesh, to give a resin emulsion for a water-based ink.

The content of the non-volatile component in the resin emulsion for a water-based ink obtained in the above was 45% by mass. The average particle diameter of the emulsion particles was 240 nm. The average molecular weight of the polymer constituting the emulsion particles was 380000. The glass transition temperature of the emulsion particles was 35° C.

Next, the resin emulsion for a water-based ink obtained in each of Examples and Comparative examples was used to prepare a water-based ink in the following method.

(1) Preparation of a Water-Based Ink

While 22 g of the resin emulsion for a water-based ink obtained in each of Examples and Comparative examples were stirring with a homogenizer (homodisper) at a rotation speed of 1000 min$^{-1}$, 23 g of a white paste, 10 g of propylene glycol, 15 g of diethylene glycol monoisopropyl ether, 0.4 g of a polyether-modified silicone surfactant [manufactured by Shin-Etsu Chemical Industry Co., Ltd. under the product number: KF-6011] and ion-exchanged water in an amount necessary for the total amount to be 100 g to the resin emulsion for a water-based ink. The resulting mixture was stirred for 30 minutes, and filtrated with a filter having an average pore size of 3 μm. [manufactured by Advantech Co., Ltd. under the product number: MCP C10S], to give an aqueous ink.

Incidentally, the white paste was prepared by dispersing 428 g of deionized water, 50 g of a dispersant [manufactured by Daiichi Kogyo Seiyaku Co., Ltd. under the trade name: DISCOAT N-14], 60 g of propylene glycol, 1000 g of titanium oxide [manufactured by Ishihara Sangyo Co., Ltd. under the product number: CR-95, average particle diameter: 0.28 μm] and 200 g of glass beads (diameter: 1 mm) as a dispersion medium by means of a homogenizer (homodisper) at a rotation speed of 3000 min$^{-1}$ for 120 minutes, and filtrating the resulting dispersion through a wire mesh having an opening of 300 mesh.

(2) Preparation of Inkjet Printed Matters

A water-based ink was charged to a print evaluation device [manufactured by Genesis Co., Ltd.] equipped with an inkjet print head [manufactured by Kyocera Corporation under the product number: KJ4B-YH06WST-STDV] in the air having a temperature of 25±1° C. and a relative humidity of 30±5%.

Next, in the print evaluation device, a head voltage was set to 26 V, a frequency was set to 4 kHz, an amount of ejected droplets was set to 12 pL (picoliter), a head temperature was set to 32° C., resolution was set to 600 dpi, and a negative pressure was set to −4.0 kPa. A corona-treated polyester film [manufactured by FUTAMURA CHEMICAL CO., LTD. under the trade name: Taiko Polyester Film FE2001] was used as a recording medium, and the corona-treated polyester film was fixed to the transport table so that the longitudinal direction of the corona-treated polyester film was arranged to be the same direction of the transporting direction. A print command was transferred to the print evaluation device, solid images were printed on the corona-treated polyester film by an inkjet recording method with a printing amount of 100% (12 pL, 600×600 dpi), and immediately after that, the corona-treated polyester film was dried for 10 seconds in a dryer having a temperature of 100° C., to give a test sheet.

The following physical properties were examined by using the water-based ink obtained in each of Examples and Comparative examples, and the test sheet obtained in the above. The results are shown in Table 1.

(1) Scratch Resistance

A pencil hardness test was performed on the printed image of the test sheet in accordance with JIS K5600, and scratch resistance was evaluated based on the following evaluation criteria.

[Evaluation Criteria]
5: Pencil hardness is F or higher.
4: Pencil hardness is HB.
3: Pencil hardness is B.
2: Pencil hardness is 2B.
1: Pencil hardness is 3B.
0: Pencil hardness is 4B or lower.

(2) Blocking Resistance

A polyester film to which a corona treatment was not applied was laminated on the printed surface of the test sheet, and a load of 2 N/cm$^2$ was applied to the polyester film in the air at 25° C. for 1 hour. Thereafter, the polyester film was quickly peeled off from the printed surface. The sense of resistance at that time of peeling off was observed, and blocking resistance was evaluated based on the following evaluation criteria.

[Evaluation Criteria]
5: No resistance is felt at all when the polyester film is peeled off.
4: Resistance is felt very slightly when the polyester film is peeled off.
3: Resistance is felt slightly when the polyester film is peeled off.
2: Resistance is clearly felt when the polyester film is peeled off.
1: Resistance is felt strongly when the polyester film is peeled off.
0: Resistance is felt very strongly when the polyester film is peeled off.

(3) Adhesion Property

The printed image of the test sheet was rubbed with a fingernail, and adhesion property of the printed image to a substrate was evaluated based on the following evaluation criteria.

[Evaluation Criteria]
5: No images are peeled off at all when the printed image is rubbed with a fingernail.
4: Images are very slightly peeled off when the printed image is rubbed with a fingernail.
3: Images are slightly peeled off when the printed image is rubbed with a fingernail.
2: Images are somewhat peeled off when the printed image is rubbed with a fingernail.
1: Images are clearly peeled off when the printed image is rubbed with a fingernail.
0: Images are easily peeled off when the printed image is rubbed with a fingernail.

(4) Comprehensive Evaluation

The sum of each score in the physical property was employed as an index for comprehensive evaluation.

TABLE 1

| Ex. and Comp. Ex. | Physical properties of water-based ink | | | |
|---|---|---|---|---|
| | Scratch resistance | Blocking resistance | Adhesion property | Comprehensive evaluation |
| Ex. 1 | 4 | 3 | 3 | 10 |
| Ex. 2 | 5 | 4 | 4 | 13 |

TABLE 1-continued

Physical properties of water-based ink

| Ex. and Comp. Ex. | Scratch resistance | Blocking resistance | Adhesion property | Comprehensive evaluation |
| --- | --- | --- | --- | --- |
| Ex. 3 | 5 | 5 | 5 | 15 |
| Ex. 4 | 3 | 3 | 3 | 9 |
| Ex. 5 | 3 | 3 | 3 | 9 |
| Ex. 6 | 4 | 3 | 4 | 11 |
| Ex. 7 | 3 | 3 | 4 | 10 |
| Ex. 8 | 4 | 4 | 4 | 12 |
| Ex. 9 | 3 | 3 | 3 | 9 |
| Ex. 10 | 5 | 3 | 5 | 13 |
| Ex. 11 | 3 | 3 | 3 | 9 |
| Ex. 12 | 4 | 3 | 4 | 11 |
| Ex. 13 | 4 | 3 | 4 | 11 |
| Ex. 14 | 4 | 3 | 4 | 11 |
| Ex. 15 | 4 | 3 | 4 | 11 |
| Ex. 16 | 4 | 3 | 5 | 12 |
| Ex. 17 | 4 | 3 | 5 | 12 |
| Ex. 18 | 4 | 2 | 5 | 11 |
| Ex. 19 | 4 | 2 | 5 | 11 |
| Comp. Ex. 1 | 0 | 0 | 0 | 0 |
| Comp. Ex. 2 | 0 | 0 | 2 | 2 |
| Comp. Ex. 3 | 0 | 0 | 3 | 3 |

From the results shown in Table 1, it can be seen that the water-based ink obtained in each of Examples was comprehensively excellent in scratch resistance, blocking resistance and adhesion property, as compared with the water-based ink obtained in each of Comparative examples.

INDUSTRIAL APPLICABILITY

The water-based ink according to the present invention is comprehensively excellent in viscosity change stability, scratch resistance, blocking resistance and adhesion property. Accordingly, the water-based ink of the present invention can be suitably used for an industrial ink for forming information such as desired characters, patterns, colors and the like on a substrate made of a material such as paper, a resin sheet, a resin film, a metal plate, a wood plate or a leather sheet by means of inkjet printing, flexographic press, offset printing, lithographic printing, gravure printing, screen printing or an ink ribbon.

The invention claimed is:

1. A resin emulsion for a water-based ink, comprising:
(A) emulsion particles comprising a polymer made of a monomer component comprising:
  (1) a nitrogen atom-containing monomer selected from the group consisting of a piperidine monomer and a tertiary amine of a (meth)acrylate in a content of 0.5 to 10% by mass; and
  (2) a hydroxyl group-containing (meth)acrylate in a content of 0.5 to 30% by mass; and
(B) 0.3 to 10 parts by mass of a carboxylic acid polymer non-metal salt per 100 parts by mass of a non-volatile component of the resin emulsion;
wherein the mass ratio of the nitrogen-containing monomer to the carboxylic acid polymer non-metal salt (nitrogen-containing monomer/carboxylic acid polymer non-metal salt) in the resin emulsion is from 1:99 to 99:1.

2. The resin emulsion for a water-based ink according to claim 1, wherein the piperidine monomer is (meth)acryloyloxy group-containing piperidine or (meth)acryloylamino group-containing piperidine.

3. The resin emulsion of claim 1 comprising 1 to 5 parts by mass of the carboxylic acid polymer non-metal salt per 100 parts by mass of the non-volatile component of the resin emulsion.

4. The resin emulsion of claim 1, wherein the carboxylic acid polymer non-metal salt is selected from the group consisting of an ammonium salt of the carboxylic acid polymer and an amine salt of the carboxylic acid polymer.

5. A method for producing a resin emulsion for a water-based ink, comprising:
(A) carrying out an emulsion-polymerization of a monomer component comprising:
  (i) a nitrogen atom-containing monomer selected from the group consisting of a piperidine monomer and a tertiary amine of a (meth)acrylate in a content of 0.5 to 10% by mass; and
  (ii) a hydroxyl group-containing (meth)acrylate in a content of 0.5 to 30% by mass, to give a resin emulsion comprising emulsion particles; and
(B) mixing the resin emulsion with 0.3 to 10 parts by mass of a carboxylic acid polymer non-metal salt per 100 parts by mass of a non-volatile component of the resin emulsion;
wherein the mass ratio of the nitrogen-containing monomer to the carboxylic acid polymer non-metal salt (nitrogen-containing monomer/carboxylic acid polymer non-metal salt) in the resin emulsion is from 1:99 to 99:1.

6. A water-based ink comprising the resin emulsion for a water-based ink according claim 1 and a colorant.

* * * * *